US012433616B2

(12) United States Patent
Youn

(10) Patent No.: US 12,433,616 B2
(45) Date of Patent: Oct. 7, 2025

(54) THROMBUS REMOVAL SYSTEM

(71) Applicant: DAEGU CATHOLIC UNIVERSITY INDUSTRY ACADEMIC COOPERATION FOUNDATION, Gyeongsan-si (KR)

(72) Inventor: Sung Won Youn, Daegu (KR)

(73) Assignee: DAEGU CATHOLIC UNIVERSITY INDUSTRY ACADEMIC COOPERATION FOUNDATION, Gyeongsan-si (KR)

( * ) Notice: Subject to any disclaimer, the term of this patent is extended or adjusted under 35 U.S.C. 154(b) by 0 days.

(21) Appl. No.: 18/288,731

(22) PCT Filed: Aug. 18, 2023

(86) PCT No.: PCT/KR2023/012242
§ 371 (c)(1),
(2) Date: Oct. 27, 2023

(87) PCT Pub. No.: WO2024/039214
PCT Pub. Date: Feb. 22, 2024

(65) Prior Publication Data
US 2025/0072917 A1    Mar. 6, 2025

(30) Foreign Application Priority Data

Aug. 18, 2022 (KR) .................. 10-2022-0103252
Sep. 13, 2022 (KR) .................. 10-2022-0114759
Nov. 3, 2022 (KR) .................. 10-2022-0145102

(51) Int. Cl.
*A61B 17/22* (2006.01)
*A61B 17/00* (2006.01)
*A61B 17/12* (2006.01)

(52) U.S. Cl.
CPC ........ *A61B 17/22* (2013.01); *A61B 17/00234* (2013.01); *A61B 17/1204* (2013.01);
(Continued)

(58) Field of Classification Search
CPC .... A61B 2217/005; A61B 2017/22079; A61B 2017/22081; A61B 17/22;
(Continued)

(56) References Cited

U.S. PATENT DOCUMENTS 4,790,813 A * 12/1988 Kensey ............ A61B 17/22031
606/159
6,676,627 B1 * 1/2004 Bonnette .......... A61B 17/32037
604/35
(Continued)

FOREIGN PATENT DOCUMENTS

JP       2014-039851 A     3/2014
KR    10-2010-0098452 A    9/2010
(Continued)

OTHER PUBLICATIONS

Korean Office Action for related KR Application No. 10-2022-0103252 mailed Mar. 15, 2023 from Korean Intellectual Property Office.
(Continued)

*Primary Examiner* — Katherine Shi
(74) *Attorney, Agent, or Firm* — Paratus Law Group, PLLC

(57) ABSTRACT

A system for removing a thrombus in a blood vessel, includes: a main body part which is movable along the blood vessel and performs a revascularization function within the blood vessel during installation, and sucks and transfers the thrombus during aspiration; a microflow circuit part which is attached to the outer surface of the main body part and extends to the exterior of the body, creates a microflow (Continued)

circuit which acts on the thrombus to move, deform, and fragment the thrombus; and an aspiration part which is provided to the exterior of the body from the inside of the blood vessel, and which during aspiration, after blocking blood flow in the blood vessel, aspirates the thrombus which has been moved, deformed and fragmented by the microflow circuit part and transferred by the main body part and discharges the thrombus to the outside of the body.

24 Claims, 29 Drawing Sheets

(52) U.S. Cl.
CPC .. *A61B 17/12136* (2013.01); *A61B 2017/003* (2013.01); *A61B 2017/00561* (2013.01); *A61B 2017/00893* (2013.01); *A61B 17/12109* (2013.01); *A61B 2017/22079* (2013.01); *A61B 2017/22082* (2013.01); *A61B 2217/005* (2013.01); *A61B 2217/007* (2013.01)

(58) Field of Classification Search
CPC .... A61B 17/32037; A61B 2017/22084; A61B 17/221; A61B 17/00234; A61B 2017/22038; A61B 2017/22051; A61B 2017/22082; A61B 2217/007; A61B 17/1204; A61B 17/12109; A61B 17/12136; A61B 17/3203; A61B 2017/00893; A61M 1/84

See application file for complete search history.

(56) References Cited

U.S. PATENT DOCUMENTS

| | | | |
|---|---|---|---|
| 2008/0275383 A1* | 11/2008 | Weisel | A61B 17/22 604/35 |
| 2016/0022294 A1 | 1/2016 | Cioanta et al. | |
| 2018/0338770 A1* | 11/2018 | Mogi | A61M 1/84 |

FOREIGN PATENT DOCUMENTS

| | | |
|---|---|---|
| KR | 10-2016-0046215 A | 4/2016 |
| KR | 10-2021-0091770 A | 7/2021 |

OTHER PUBLICATIONS

Korean Office Action for related KR Application No. 10-2022-0114759 mailed Mar. 15, 2023 from Korean Intellectual Property Office.

Korean Office Action for related KR Application No. 10-2022-0145102 mailed Mar. 15, 2023 from Korean Intellectual Property Office.

* cited by examiner (a)　　　　　　　　　　(b)

THROMBUS REMOVAL SYSTEM

CROSS-REFERENCE TO RELATED APPLICATIONS

This Application is a National Stage Patent Application of PCT International Application No. PCT/KR2023/012242 (filed on Aug. 18, 2023), which claims priority to Korean Patent Application Nos. 10-2022-0103252 (filed on Aug. 18, 2022), 10-2022-0114759 (filed on Sep. 13, 2022), and 10-2022-0145102 (filed on Nov. 3, 2022), which are all hereby incorporation by reference in their entirety.

BACKGROUND

The present disclosure relates to a thrombus removal system, and more specifically, to a thrombus removal system which allows for continuous thrombus aspiration through revascularization of endovascular blood flow and generation of a microfluidic circuit via a plurality of side holes, can finely break or crush thrombi to thoroughly remove the thrombi, and remove thrombi while minimizing vessel damage and the occurrence of embolism at a distal portion of the crushed thrombi.

Cerebral stroke is the third most common cause of death worldwide, and about 140,000 Americans die from cerebral strokes every year.

87% of strokes are ischemic strokes that blood flow to a brain region is blocked. If thrombi are not removed within the golden hour, cerebral blood flow is obstructed, leading the cerebral stroke to progress and causing irreversible brain damage.

A stent retriever or an aspiration catheter are thrombus removal systems which have been developed and realized to safely and effectively remove thrombi and revascularize the blood flow. Thrombectomy using a stent retriever or an aspiration catheter is recognized as a safe and effective thrombus removal treatment.

The thrombectomy using a stent retriever or an aspiration catheter has proven safety and efficacy, for example, revascularization success rate through manifold clinical trials is as high as 70 to 80%, and has become the standard treatment for acute strokes caused by major vessel occlusion. According to standard treatment guidelines, acute stroke patients within 24 hours of symptom onset and arousal stroke patients with an unknown time of symptom onset are candidates for endovascular thrombectomy.

However, the endovascular thrombectomy using the existing stent retriever or aspiration catheter has several disadvantages, such as 1) vascular damage, 2) the risk of distal embolization, and 3) the need for installing thrombus removal systems several times.

1) Vascular Damage

The thrombectomy using the existing stent retriever may cause vascular damage, a headache, and vasospasm since applying the mechanical pressure onto the vessel by the stent structure. Furthermore, the thrombectomy using the existing stent retriever may even cause complications like subarachnoid hemorrhage from vessel rupture or cerebral vessel wall damage.

The use of a regular aspiration catheter rarely causes brain vessel damage or perforation, but may cause fatal complications.

In animal experiments, endothelial cell damage and proliferation have been observed after thrombectomy using a stent retriever, and post-thrombectomy vascular wall MRI showed increased wall thickness and contrast enhancement. In order to reduce such complications, an endovascular thrombus removal system that minimizes contact with the vessel wall is desirable.

2) Distal Embolization

During a typical thrombus removal procedure, there is a risk of the development of thrombus to a new vascular area different from an area of the original thrombus. Accordingly, the typical thrombus removal procedure can cause potential side effects of distal embolization at a frequency of 1 to 8.6% during the procedure.

Since the thrombus rupture due to weakening of the internal binding force of the thrombus can cause cerebral infraction in a new vascular area, namely iatrogenic embolism, efforts for preventing or minimizing the thrombus rupture are needed. Existing thrombus removal devices can cause structural deformation, elongation, and fracture of the thrombus due to tensile forces applied to the thrombus, leading to embolization.

During a process that the typical stent retriever pulls down the thrombus, the thrombus caught to the thrombus may be elongated and fragmented due to the tensile forces. Alternatively, the thrombus may be separated from the thrombus removal system, and the thrombi or fragments can travel or be dispersed along the blood flow to distal vessels. Fractured thrombus pieces (emboli) can travel along the bloodstream to smaller peripheral vessels, and block other blood vessels, thereby damaging the blood supply to tissues.

In contrast, in endovascular thrombectomy procedures to remove arteriovenous fistula occlusion or venous thrombosis, a procedure step of fragmenting and macerating the thrombus is routinely performed before the aspiration thrombectomy. Before aspiration of the thrombus, fragmenting or abrading the thrombus through balloon dilation, and rotation of a pigtail catheter under the guidance of a j-tip wire with a 0.035 inch size in the thrombus is routinely performed. The above method facilitates the advancement of the catheter, and enhances the thrombus aspiration. When the aspiration catheter is placed in position, negative pressure is maintained for 30 seconds, and then, the catheter is pulled out while maintaining the negative pressure, the thrombus is removed. On the other hand, thrombectomy in cerebral vessels does not promote intentional fragmentation of thrombus due to the risk of distal embolization.

3) Necessity for Repetitive Installation of the Thrombus Removal System Due to Failure in Thrombus Retrieval/Revascularization With the development of conventional thrombectomy devices, the revascularization success rate has significantly increased. However, the thrombectomy devices can still fail in removing thrombi. Since not all thrombi are cleanly retrieved in a single thrombectomy attempt, it is necessary to move the thrombus removal system into the blood vessel several times.

Furthermore, the general aspiration catheter is a useful tool for thrombectomy, but the aspiration success rate of the aspiration catheter depends on the diameter of the catheter. However, regardless of the large diameter of the catheter, interruption of aspiration may occur due to blockage of an inner cavity of the aspiration catheter during the aspiration process through the aspiration catheter. In order to continue the aspiration technique, it is necessary to get the aspiration catheter, which is blocked by the thrombus, out of the body and clean the inner cavity of the catheter. Therefore, to revascularize the major vessel occlusion, it is required to pass the thrombus removal system several times, prolonging the procedure and increasing the risk of ischemic brain injury.

As described above, in many cases, the success or fail of the procedure depends on the skill level of an operator who can position a large diameter aspiration catheter in a target vessel, and so, it is difficult to standardize the procedure protocol.

SUMMARY

Accordingly, the present invention has been made in view of the above-mentioned problems occurring in the related art, and it is an object of the present invention to provide a thrombus removal system which can continuously aspirate thrombus by creating a microfluidic circuit through a plurality of side holes, cleanly remove the thrombus by breaking down or fragmenting the thrombus into small pieces, and remove the thrombus while minimizing vascular damage and distal embolization of fragmented thrombus.

Additionally, it is another object of the present invention to provide a thrombus removal system, which creates the microfluidic circuit to continuously deform the thrombus and break the thrombus down, and recovers the thrombus through a guide catheter by moving the fragmented thrombus along the created microfluidic circuit, thereby effectively fragmenting and removing even the thrombi in vessels with a small diameter and tortuous paths, like cerebral vessels, and minimizing vascular damage since not a hard material like metal but a fluid jet directly acts on the vessel wall.

To accomplish the above-mentioned objects, according to the present invention, there is provided a system for removing a thrombus generated in a blood vessel, including: a main body part which is moved along the blood vessel to be positioned within the blood vessel where the thrombus has occurred, performs a revascularization function within the blood vessel during installation, and sucks and transfers the thrombus during aspiration; a microflow circuit part which is attached to the outer surface of the main body part and extends to the exterior of the body, creates a microflow circuit which acts on the thrombus to move, deform, and fragment the thrombus; and an aspiration part which is provided to the exterior of the body from the inside of the blood vessel, and which during aspiration, after blocking blood flow in the blood vessel, aspirates the thrombus which has been moved, deformed and fragmented by the microflow circuit part and transferred by the main body part and discharges the thrombus to the outside of the body.

According to the present invention, the thrombus removal system can continuously aspirate thrombus by creating a microfluidic circuit through a plurality of side holes, cleanly remove the thrombus by breaking down or fragmenting the thrombus into small pieces, and remove the thrombus while minimizing vascular damage and distal embolization of fragmented thrombus.

Additionally, the thrombus removal system according to the present invention can create the microfluidic circuit to continuously deform the thrombus and break the thrombus down, and recover the thrombus through a guide catheter by moving the fragmented thrombus along the created microfluidic circuit, thereby effectively fragmenting and removing even the thrombi in vessels with a small diameter and tortuous paths, like cerebral vessels, and minimizing vascular damage since not a hard material like metal but a fluid jet directly acts on the vessel wall.

The effects of the present disclosure are not limited to the above-mentioned effects, and other effects, which are not specifically mentioned herein, will be clearly understood by those skilled in the art from the following description.

DETAILED DESCRIPTION

Figure 1:
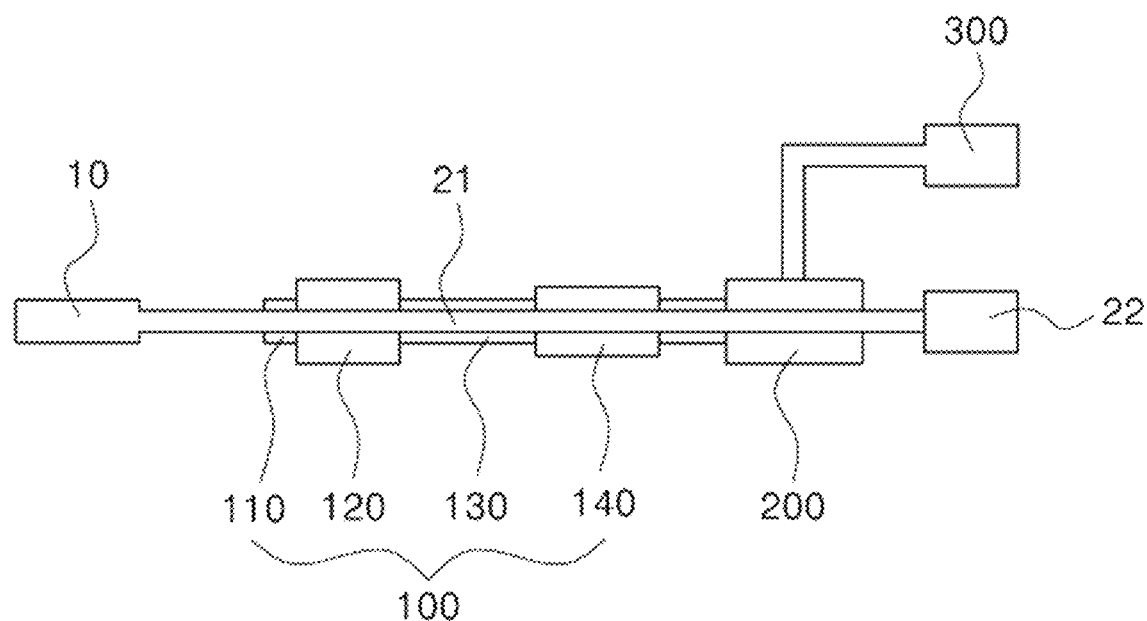
FIG. 1 is a schematic diagram illustrating a thrombus removal system according to a first embodiment of the present invention.
Figure 2:
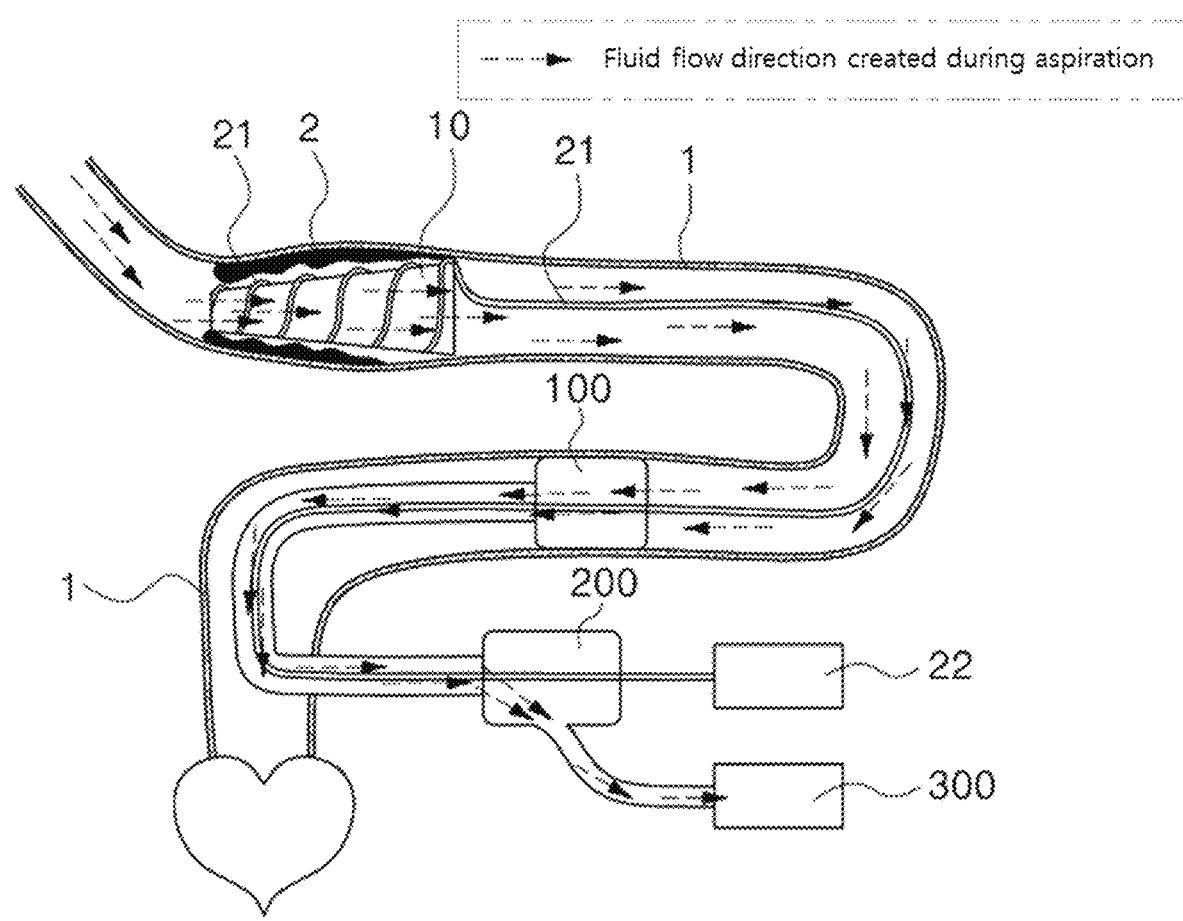
FIG. 2 is a schematic diagram illustrating the thrombus removal system installed inside a blood vessel according to the first embodiment of the present invention.
Figure 3:
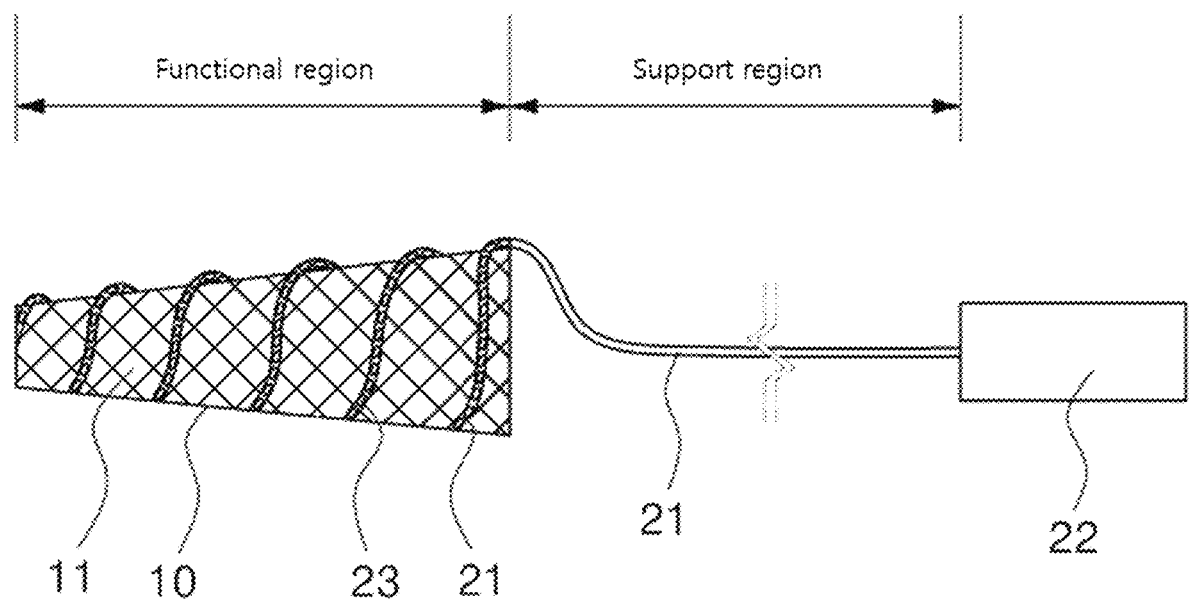
FIG. 3 is a front view illustrating a main body part and a microflow circuit part according to the first embodiment of the present invention.
Figure 4:
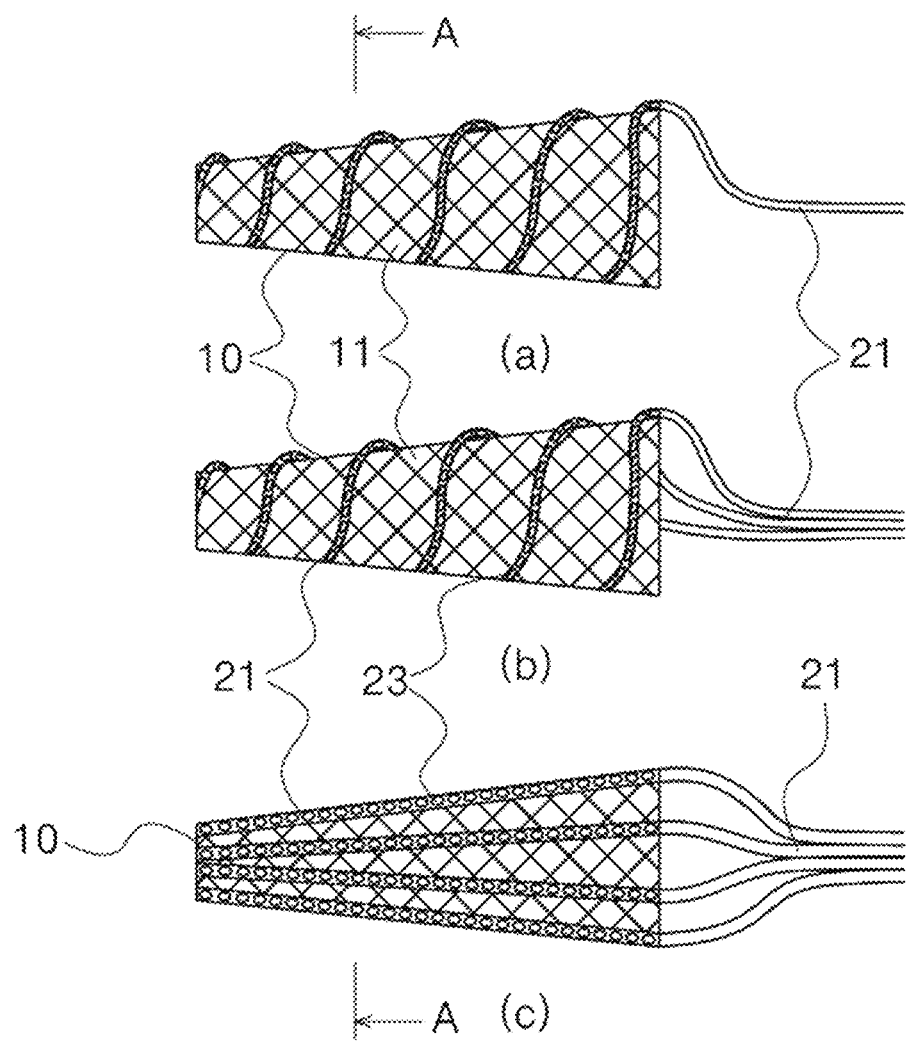
FIG. 4 is a view illustrating various examples of the microflow circuit part according to the first embodiment of the present invention.
Figure 5:
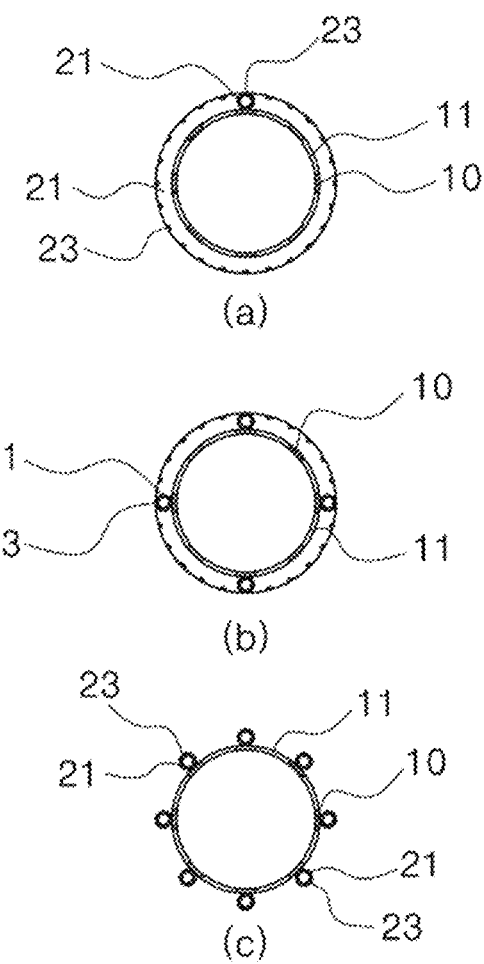
FIG. 5 is a sectional view illustrating the part A-A of FIG. 4.
Figure 6:
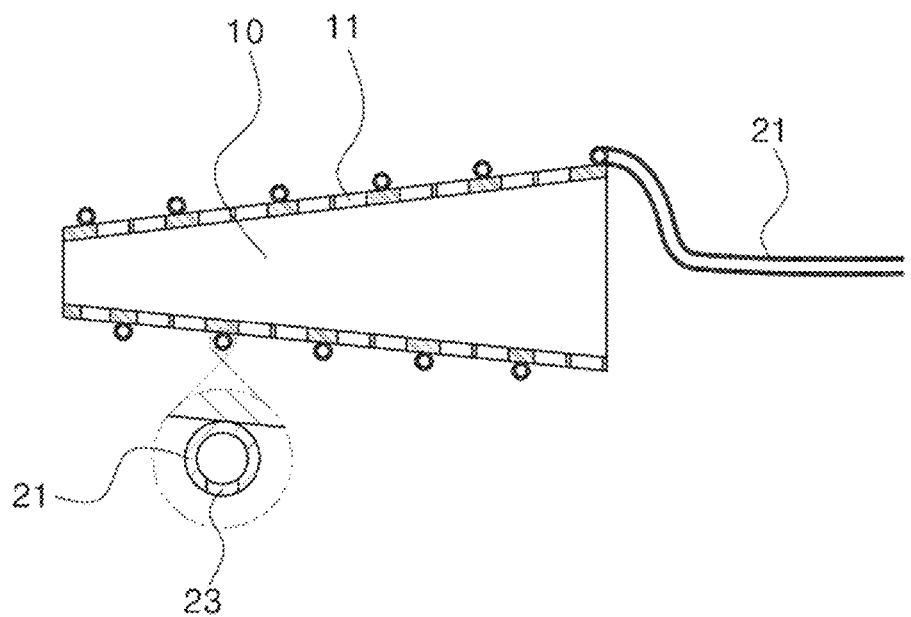
FIG. 6 is a sectional view illustrating the main body part and the microflow circuit part according to the first embodiment of the present invention.
Figure 7:
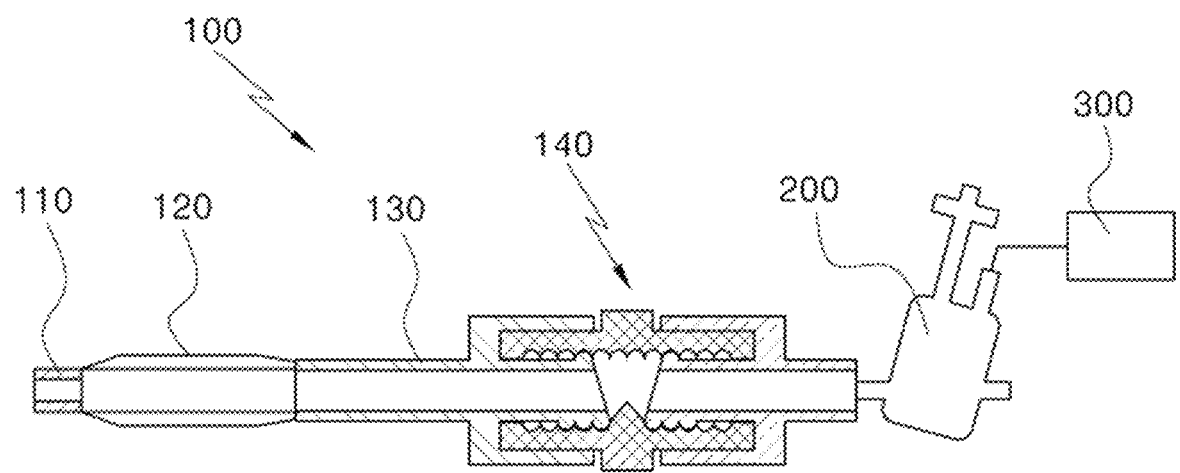
FIG. 7 is a schematic diagram illustrating an aspiration part according to the first embodiment of the present invention.
Figure 8:
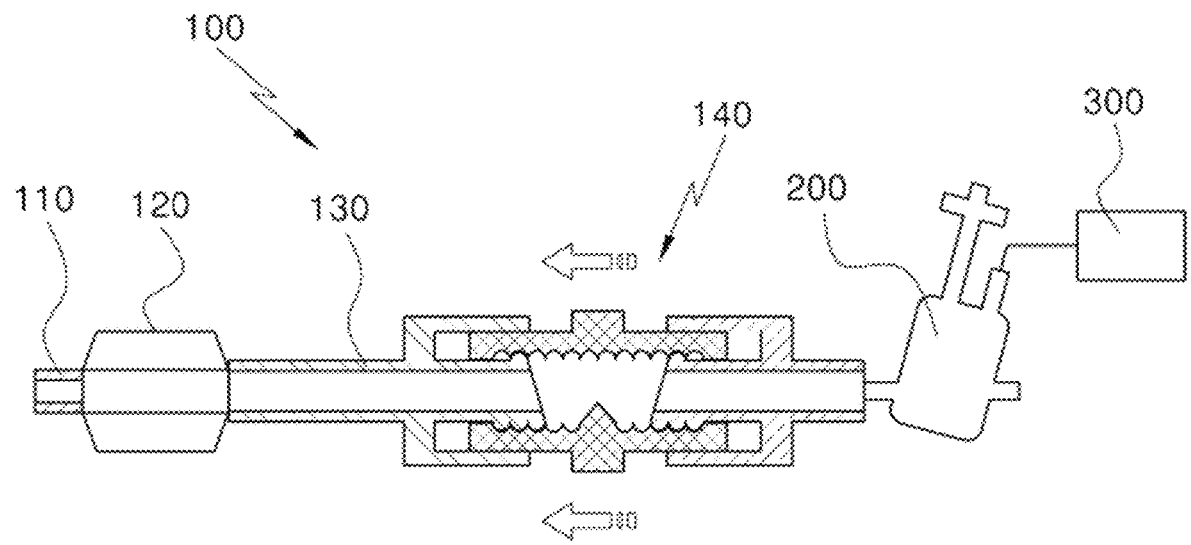
FIG. 8 is an operational diagram illustrating the operation of FIG. 7.
Figure 9:
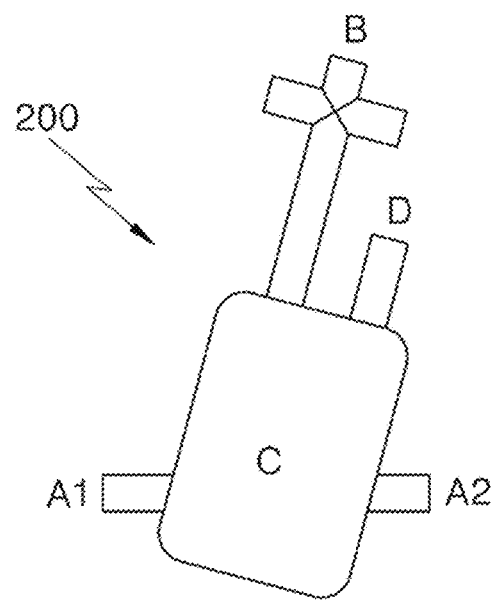
FIG. 9 is a schematic diagram illustrating a hub according to the first embodiment of the present invention.
Figure 10:
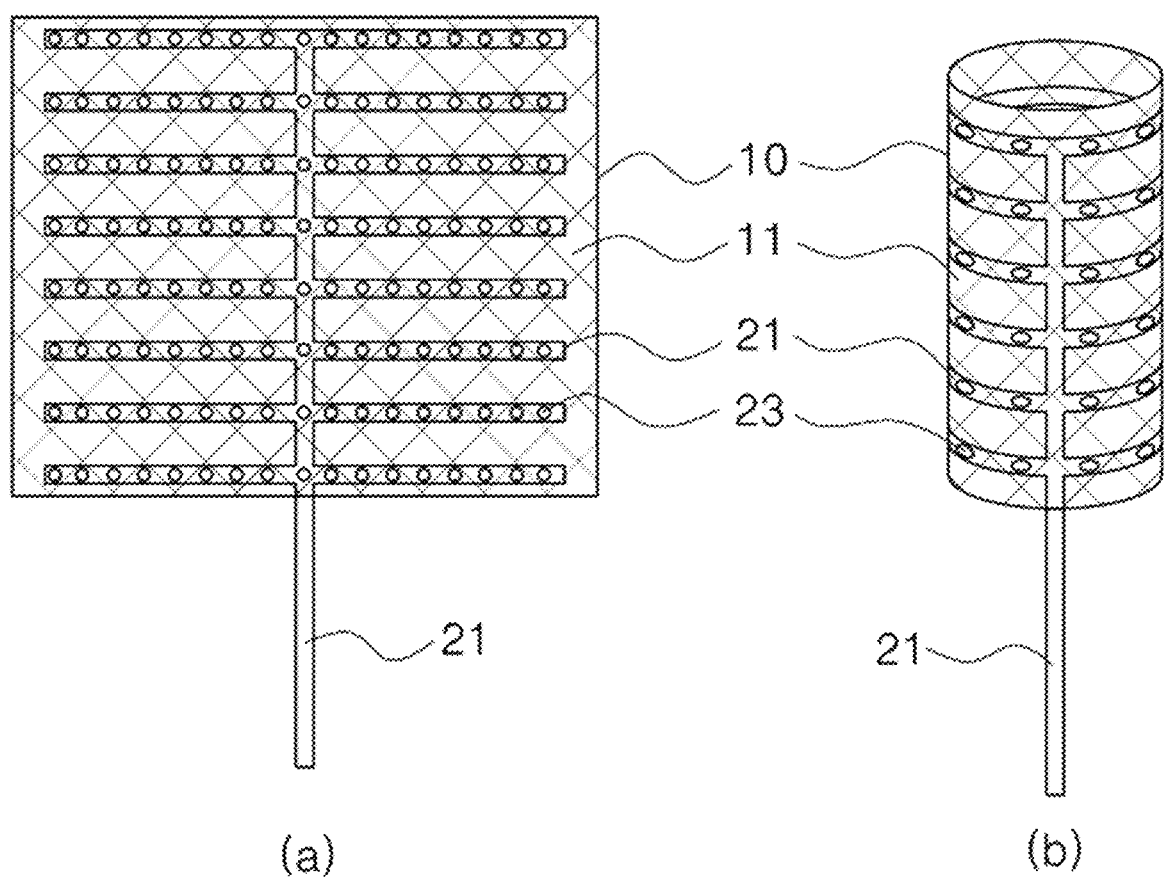
FIG. 10 is a schematic diagram illustrating another example of the microflow circuit part according to the first embodiment of the present invention.

Terms used in the present specification will be briefly described, and a detailed description of the present invention will be provided.

The terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Therefore, the terms used herein have to be defined based on the meaning of the terms together with the description throughout the specification.

Also, when a part "includes" a component, unless there is a particular description contrary thereto, the part can further include other components, not excluding the other components.

Before a variety of Examples of the present invention will be described in detail, it can be noted that applications are not limited to detailed descriptions of a configuration and arrangements of components to be described in the detailed description or illustrated in the drawings. The present invention will be realized by other examples, and performed by a variety of methods. In addition, the expressions and phrases used for the terms indicating directions of an apparatus or factor (e.g., "front," "back," "up," "down," "top," "bottom," "left," "right," "lateral," etc.) are merely used to simplify the description of the present invention, and it can be noted that it does not mean that the related apparatuses or factors simply have a specific directions. In addition, terms such as "first" and "second" are used in the present invention and the attached claims for descriptive purposes and are not intended to indicate or imply any relative significance or intention.

Hereinafter, the embodiments of the present disclosure will be described in detail with reference to accompanying drawings so that the embodiments may be easily implemented by those skilled in the art. However, the present disclosure may be implemented in various ways without being limited to the embodiments.

Specific details of the invention including the objectives, solutions, and effects of the present invention are encompassed in the following embodiments and drawings. Advantages and features of the present invention, and method to achieve them of the present invention will be obvious with reference to embodiments along with the accompanying drawings which are described below.

Hereinafter, the invention will be described in more detail with reference to the attached drawings.

As illustrated in FIGS. 1 through 10, a thrombus removal system of a stent retriever type capable of revascularization of an endovascular blood flow and the creation of a microflow circuit is an apparatus to remove a thrombus 2 formed inside a blood vessel 1, and includes a main body part 10, a microflow circuit part, and an aspiration part.

The main body part 10, as illustrated in FIGS. 1 through 6 and FIG. 10, is positioned and installed along the blood vessel 1 to be located in the blood vessel 1 blocked by the thrombus, and generates revascularization in the blood vessel 1. For aspiration of the thrombus, the main body part induces the thrombus 2 moved, deformed and fragmented through creation of the creation of a microfluidic circuit in a halted blood flow state, and then, transfers the thrombus toward the aspiration part.

Here, the main body part 10 is designed in the form of a cylindrical stent retriever so that both ends and the inside are penetrated, and a plurality of inflow holes 11 is formed in the outer surface of the main body part 10 so that the moved, deformed and fragmented thrombus 2 is introduced into the main body part 10 by the microflow circuit part. In this instance, the inflow holes 11 are formed not to overlap with a microfluidic transfer tube 21 attached to the outer surface of the main body part 10. That is, after the microfluidic transfer tube 21 is attached to the outer surface of the main body part 10, the plurality of inflow holes 11 are formed in the remaining area, and then, the thrombus 2, blood, and other fluids enter through the inflow holes 11 and are transferred to the aspiration side through the inside of the main body part 10.

Moreover, the cylindrical stent retriever of the main body part 10 is made of a soft flexible material or a material having self-expansion properties, such as nitinol alloy, to minimize damage to the vessel 1. The main body part 10 is formed in such a way that the diameter is gradually widened from the front to the rear so that the main body part 10 can easily enter in the movement direction. In this instance, the stent retriever is manufactured in the form of a stent, is typically made of nitinol alloy, has the property of self-expansion upon installation. During the procedure using the stent retriever, a micro-catheter passes through a thrombus section, and advances within the micro-catheter. After the stent retriever is positioned at the thrombus region, when the micro-catheter is removed, the stent retriever is self-expanded and installed.

The microflow circuit part, as illustrated in FIGS. 1 through 6 and FIG. 10, is attached to the outer surface of the main body part 10 and provided to the exterior of the body, and includes a microfluidic transfer tube 21 and a microinjection pump 22 to create a microflow circuit to move, transform, and fragment the thrombus 2 by transferring microfluid.

Here, the microfluidic transfer tube 21 is attached to the outer surface of the main body part 10 not to overlap with the inflow holes 11 of the main body part 10 and is provided to the exterior of the body along the inside of the aspiration part. The microfluid injected through the microinjection pump 22 is transferred inside the microfluidic transfer tube 21 and is sprayed onto the thrombus 2.

Furthermore, at least one microfluidic transfer tube 21 may be formed, is spirally wound and attached onto the outer circumference of the cylindrical tube of the main body part 10, and then, is provided to the exterior of the body along the inside of the aspiration part.

Moreover, the microfluidic transfer tubes 21 may be spirally wound on the outer circumference of the cylindrical tube of the main body part 10 as illustrated in FIGS. 4(a), 4(b), 5(a), and 5(b), the plurality of microfluidic transfer tubes 21 may be formed in a straight line in the length direction of as illustrated in FIGS. 4(c) and 5(c), may be designed in various other forms. The plurality of microfluidic transfer tubes 21 are respectively attached to the outer circumference of the main body part 10, and then, penetrate the inside of the aspiration part through the outer circumference of the main body part 10 in a state in which they are merged into one.

On the other hand, in another example of the microfluidic transfer tubes 21, FIG. 10(a) illustrates that the main body part 10 is in a unrolled state, and FIG. 10(b) illustrates that the main body part 10 is in a cylindrically rolled state. The plurality of microfluidic transfer tubes 21 are provided on the inside or the outside of the main body part 10 straightly and diverge bidirectionally, and a plurality of discharge holes 23 are formed in the diverged microfluidic transfer tubes 21 and in the straight microfluidic transfer tubes 21.

In this instance, the diverged microfluidic transfer tubes 21 are intertwined along the inflow holes 11 formed on the stent retriever type main body part 10 and are fixed to the main body part 10. The discharge holes 23 are formed on the microfluidic transfer tube 21 exposed outward from the main body part 10.

Additionally, the plurality of discharge holes 23 are formed in the microfluidic transfer tubes 21 attached to the outer circumference of the main body part 10, so that the fluid transferred into the microfluidic transfer tubes 21 are directly sprayed to the thrombus 2 in the vessel 1, namely, to the outside of the main body part 10.

In addition, the microfluidic transfer tube 21, which is attached to the outer circumference of the main body part 10, is divided into a functional region which sprays the fluid to the thrombus 2 through the discharge holes 23, and a support region which is provided to the outside of the vessel 1 along the inside of the aspiration part to support the main body part 10. Since a material with high hardness such as metal is not in direct contact with the vessel wall but a fluid jet from the microfluidic transfer tube 21 is in contact with the blood vessel wall, it minimizes damage to the blood vessel 1. The microfluidic transfer tube is made of a soft flexible material. At this time, to improve the efficiency of thrombus removal, the position of the main body part 10 can be adjusted in the blood vessel 1 by holding the microfluidic transfer tube 21 in the support area to effectively act on the thrombus section.

The microinjection pump 22 is connected to one end of the microfluidic transfer tube 21 located outside the body to regulate to minutely inject fluid into the microfluidic transfer tube 21.

Here, the microinjection pump 22 is synchronized with an aspiration pump 300 of the aspiration part, such that when the microinjection pump 22 operates or the aspiration pump 300 operates, the microinjection pump 22 operates together with the aspiration pump simultaneously. In this instance, The reason for the simultaneous operation will be described below.

The aspiration part, as illustrated in FIGS. 1 to 2 and FIGS. 7 to 9, includes a guide catheter 100, a hub 200, and an aspiration pump 300, which are provided from the inside of the blood vessel 1 to the outside of the body, block the blood flow in the blood vessel 1 during the aspiration procedure, aspirate the thrombus 2 moved, deformed and fragmented by the microflow circuit part and transferred by the main body part 10, and discharge the thrombus to the outside.

The guide catheter 100 has one side located inside the blood vessel 1 to block the blood flow in the blood vessel 1, the other side located outside the blood vessel 1, an internal passage which guides the microfluidic transfer tube 21 and other endovascular devices, and an expansion part which expands to aspirate and remove thrombus, blood, and fluid when the blood flow is blocked. That is, the guide catheter 100 includes a tip 110, an expansion part 120 which is formed on one side of the tip 110 and can expand and contract to directly block inside the blood vessel 1, a body part 130 which is formed on one side of the expansion part 120 to induce the expansion and contraction of the expansion part 120, and a control part 140 which is formed on one side of the body part 130, is connected to the hub 200 on the other side, and drives the body part 130 left and right to expand and contract the expansion part 120.

Here, the tip 110 of the guide catheter 100 is formed at the outermost end of the guide catheter 100 in a cylindrical shape, guides the microfluidic transfer tube 21 and other endovascular devices, and enables the aspiration and removal of thrombus, blood, and fluid. The tip 110 is formed in a cylindrical shape of which the diameter gets narrower or is constant toward the front of the the guide catheter 100 to facilitate navigation when advancing in the movement direction, and is made of flexible material, thereby making navigation through the blood vessel system easy.

Moreover, the expansion part 120 has a balloon section or expansion section, which is formed between the tip 110 and the body part 130 to be expandable to tightly adhere to the inner wall of the blood vessel 1, to block the blood vessel 1. The expansion part 120 has a frame, such as a strut or a wire, and an elastic membrane surrounding the frame. The front end of the strut structure of the expansion part 120 is fixed to the tip 110, and the rear end of the strut structure of the expansion part 120 is fixed to the body part 130. The expansion part 120 has a plurality of pins formed in the circumferential and longitudinal directions of a cylindrical shape and is made with a wire made of a superelastic shape memory alloy or titanium material. The wire is woven or crossed in the circumferential and longitudinal directions of a stent manufacturing jig to form a net shape having a plurality of spaces, thereby adjusting the length of the expansion part 120 in the back-and-forth direction, and expanding or contracting to change the outer diameter of the expansion part.

Furthermore, the body part 130 has a monorail formed on the inner wall (body wall) that allows the wire to slide. One end of the monorail wire is fixed to the expansion part 120 and the other end is fixed to the control part 140.

Additionally, the control part 140 has a toothed wheel that regulates the movement of the body part 130 moving along the wire, and is located between the body part 130 and the hub 200. In this instance, the toothed wheel operates the body part 130 back and forth while rotating helically and pushing and pulling the wire. At the same time, the expansion part 120 repeats expansion and contraction such that the diameter of the expansion part 120 gets larger and smaller while operating back and forth.

The hub 200 is connected to the end portion of the guide catheter 100 provided outside the body to connect various devices. The hub 200 is formed of a transparent material and is formed to connect a guide catheter port A1, a contrast and transfusion port B, an aspiration pump port D, a central chamber C, and a microflow circuit port A2. In this instance, a sensor which detects the presence or absence of air is further installed inside the hub 200, thereby allowing for the removal of air when detected by the sensor.

The aspiration pump 300 is connected to one side of the hub 200 to aspirate fluids, blood, and thrombus 2. During aspiration, the aspiration force is transmitted to the inside of the main body part 10, functioning as a negative pressure. The occlusion of blood flow caused by the expansion of the expansion part not only prevents the thrombus 2 from moving toward the proximal part of the blood vessel 1 but also provides a sealed space during the thrombus aspiration process so that negative pressure is stably transferred to the inner cavity of the main body part 10, thereby enabling the creation of a secondary fluid jet of the inflow holes 11.

Hereinafter, the operation method of the thrombus removal system described above will be described in detail step by step.

Step 1) Installation of Guide Catheter

In order to remove the thrombus 2 occluding the blood vessel 1, the distal expansion guide catheter 100 is positioned at an entrance of a target blood vessel 1.

Step 2) Microfluid Supply and Advancement within Blood Vessel

As a preparation step for removal of a thrombus 2, a fluid is supplied from the microinjection pump 22 to make the surface of the thrombus removal system hydrophilic. The fluid supply status and amount of the microflow circuit is adjusted to prevent the thrombus removal system from being adhered to the wall of the blood vessel 1, to maintain the thrombus removal system positioned inside the blood vessel 1, and to advance the thrombus removal system with low friction to reach the target blood vessel section. The thrombus removal system has a distal portion which is more flexible than to facilitate the a proximal portion navigation/advancement/manipulation of the thrombus removal system through the vascular system.

The thrombus removal system is moved forward after being inserted through the inside of the guide catheter 100, such that the main body part 10 and the microflow circuit part are moved outward, advancing out of the guide catheter 100. The thrombus removal system is advanced concentrically with the guide wire, or approaches the target blood vessel section using reduced friction by the fluid supply control of the fluid flow circuit.

Step 3) Immediate Endovascular Revascularization (Endovascular Flow Bypass)

The thrombus removal system is inserted into the distal expansion guide catheter 100 and advances to the blood vessel section occluded by the thrombus 2. As soon as the thrombus removal system is positioned in the thrombus section, the thrombus 2 is pushed into a space between the thrombus removal system and the blood vessel wall, and immediate endovascular revascularization occurs through an inner cavity of the thrombus removal system. When the functional region of the device to cover the entire part of the thrombus 2 is positioned, the thrombus 2 blocking the blood vessel 1 can be displaced to the side of the blood vessel wall. The thrombus 2 pushed by the functional region of the thrombus removal system positioned in the thrombus section is trapped (displaced) in the space between the thrombus removal system and the blood vessel wall. Meanwhile, the blood flow occupying the center of the cross-section of the blood vessel 1 passes through the entire part of the thrombus 2.

Step 4) Generation and Action of Microfluidic Circuit

In a state in which the outer diameter of the expansion part 120 of the guide catheter 100 is increased to stop the blood flow, the synchronized microinjection pump 22 and aspiration pump 300 operate to create a microfluidic circuit. The fluid, such as saline, injected from the microinjection pump 22 moves through the microfluidic tube 21 of the support region to the microfluidic tube 21 of the functional region, and is sprayed into the space between the thrombus removal system and the blood vessel wall through the discharge holes 23 of the microfluidic tube 21.

At this time, when the fluid injection system operates the microinjection pump 22 to inject the fluid, the fluid pressure is transmitted to the discharge holes 23 through the microfluidic tube 21. The fluid such as saline flows along the support region of the microfluidic tube 21, and is sprayed into the space between the thrombus removal system and the blood vessel wall while a fluid jet is generated through the discharge holes 23 at the functional region of the microfluidic tube 21.

Due to the jet stream generated on the outer surface of the thrombus removal system/physiological saline jet through the discharge holes 23, the thrombus meets with an increase in the moisture content of the thrombus, changes in viscoelasticity, deformation, wear, division, and the likes. Correspondingly, the thrombus removal system generates aspiration force through the guide catheter 100 of the aspiration part and moves the thrombus, which has been reduced in size due to deformation, wear, etc., along along the jet stream and fluid circuit created through the plurality of inflow holes 11 and discharge holes 23 provided between the inner and outer cavities of the thrombus removal system to deform and aspirate the thrombus much more. The thrombus is deformed sequentially and gradually removed while moving along the microfluidic circuit.

Moreover, the aspiration pump 300 operates simultaneously corresponding to the microinjection pump 22. The aspiration pump 300 connected to the guide catheter 100 performs a continuous aspiration, and negative pressure occurs throughout the path of the blood vessel 1 and the inner cavity of the thrombus removal system. Due to the negative pressure, the physiological saline (fluid) injected by the microinjection pump 22 enters the inner cavity of the thrombus removal system through the inflow holes 11 of the main body part 10, and at this time, the finely broken thrombus 2 is simultaneously aspirated into the aspiration pump 300 through the guide catheter 100.

Here, the thrombus 2 is torn and gets smaller while being pushed out from the discharge holes 23 or sucked into the inflow holes 11 by the jet fluid, and moves. To enhance aspiration force, the outer diameter of the guide catheter 100 is increased, such as by expansion of the expansion part 120, and the outer wall of the guide catheter 100 is in close contact with the inner wall of the vessel 1 to stop the flow, thereby creating a closed space.

In a state in which the blood flow is stopped, the aspiration from the aspiration pump 300 connected to the hub 200 is started, and the generated negative pressure propagates to the central tube cavity of the thrombus removal system. The negative pressure in the inner cavity of the guide catheter 100 creates a fluid jet in the inward direction of the functional region of the microfluidic transfer tube 21, thereby forming a microfluidic circuit. The negative pressure in the inner cavity of the thrombus removal system creates a fluid jet between the outer and inner cavities of the main body part 10 through the inflow hole 11, thereby inducing fragmentation and movement of the thrombus 2. The thrombus 2 along the fluid jet becomes fragmented and miniaturized, and is stuck in the inflow holes 11 while moving, thereby being fragmented or being deformed to be smaller to pass and move through the holes.

Step 5) Recovery of Thrombus Removal System

To finish the aspiration process through the microcircuit, the thrombus removal system, which was positioned in the blood vessel section coaxially with the guide catheter 100, is slowly recovered from the body while simultaneously executing the aspiration of the microinjection pump 22 and the aspiration of the aspiration pump 300. To provide continuous effective aspiration force of the microflow circuit, an additional aspiration catheter is installed coaxially inside the guide catheter 100, is positioned at the thrombus section, and is connected to the aspiration pump 300, such that the aspiration catheter and the thrombus removal system can be slowly removed from the body as one unit. Such a method has the advantage of being able to recover the thrombus removal system while maintaining a microfluidic circuit due to the synchronized operation of the microinjection pump 22 and the aspiration pump 300 throughout the entire recovery process.

Hereafter, a thrombus removal system according to a second embodiment of the present invention will be described with reference to the attached drawings.

As illustrated in FIGS. 11 to 23, the thrombus removal system of an aspiration catheter type capable of creating an endovascular revascularization and a microflow circuit is a device for removing a thrombus 2 that has occurred inside a vessel 1, and includes a main body part 10, a microflow circuit part, an aspiration part, and a microwire part.

As illustrated in FIGS. 11 to 17, the main body part 10 is positioned and installed along the blood vessel 1 to be located in the blood vessel 1 blocked by the thrombus, and generates revascularization in the blood vessel 1. For aspiration of the thrombus, the main body part induces the thrombus 2 moved, deformed and fragmented through creation of the creation of a microfluidic circuit in a halted blood flow state, and then, transfers the thrombus toward the aspiration part. In this instance, the main body part 10 is made of a soft material capable of minimizing damage of the blood vessel 1 or formed by performing a Nitinol alloy braiding to apply suitable strength to the conventional soft material.

Here, the main body part 10 includes: an outer aspiration catheter 11 which has a cylindrical shape and of which both end portions and a hollow interior are penetrated; an inner aspiration catheter 12 which has a cylindrical shape to be provided within the outer aspiration catheter 11 and is formed to be spaced apart from the inner surface of the outer aspiration catheter 11 so that microfluid of the microflow circuit is transferred to the space; a plurality of connection parts 13 which are formed between the inner surface of the outer aspiration catheter 11 and the outer surface of the inner aspiration catheter 12 to form a spacing space 16 and are formed along the inner circumference of the outer aspiration catheter 11 and the outer circumference of the inner aspiration catheter 12; a front cover part 14 which is formed in a ring shape at the front of the outer and inner aspiration catheters 11 and 12 to block the spacing space 16 through which the microfluid is transferred; and a rear cover part 15 which is formed in a ring shape at the rear of the outer and inner aspiration catheters 11 and 12, communicates with the microflow circuit to transfer the microfluid from the microflow circuit to the spacing space 16.

In addition, the cylindrical outer aspiration catheter 11 and the cylindrical inner aspiration catheter 12 are formed to have varying diameters, getting narrower at the front and wider towards the rear in the movement direction.

Additionally, on the outer surface of the outer aspiration catheter 11 where the spacing space 16 is located, a plurality of discharge holes 17 are formed to spray the microfluid transferred to the spacing space 16 onto the thrombus 2 inside the blood vessel 1.

Figure 17:
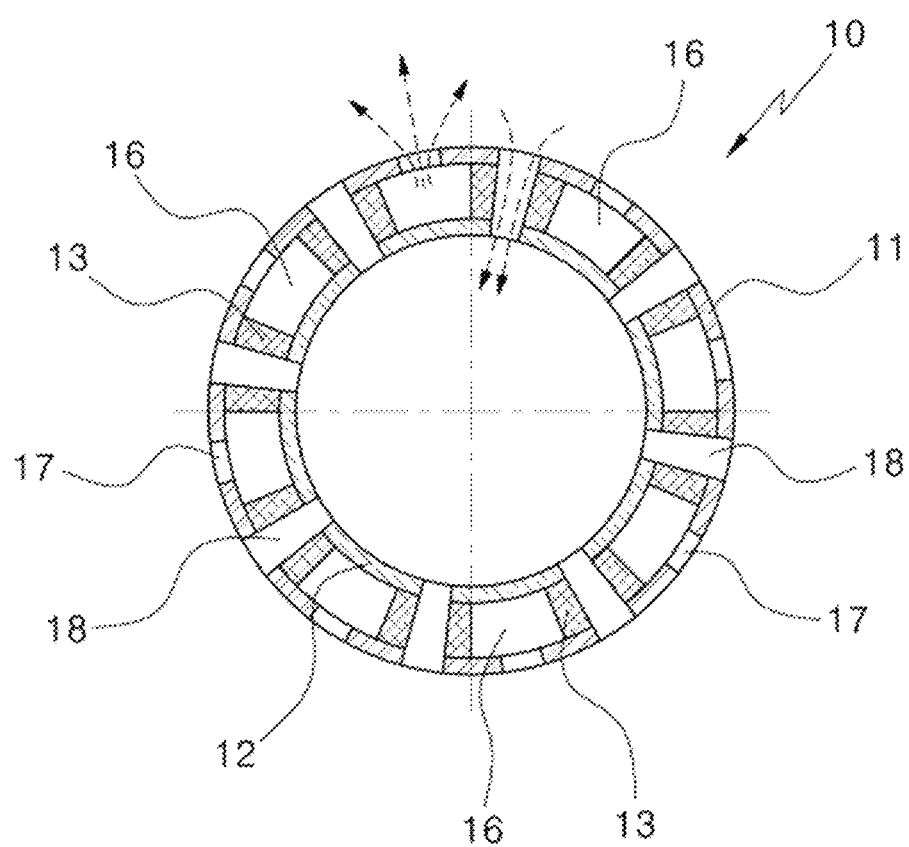
FIG. 17 is a sectional view illustrating a flow of microfluidic in the main body part according to the second embodiment of the present invention.
Figure 18:
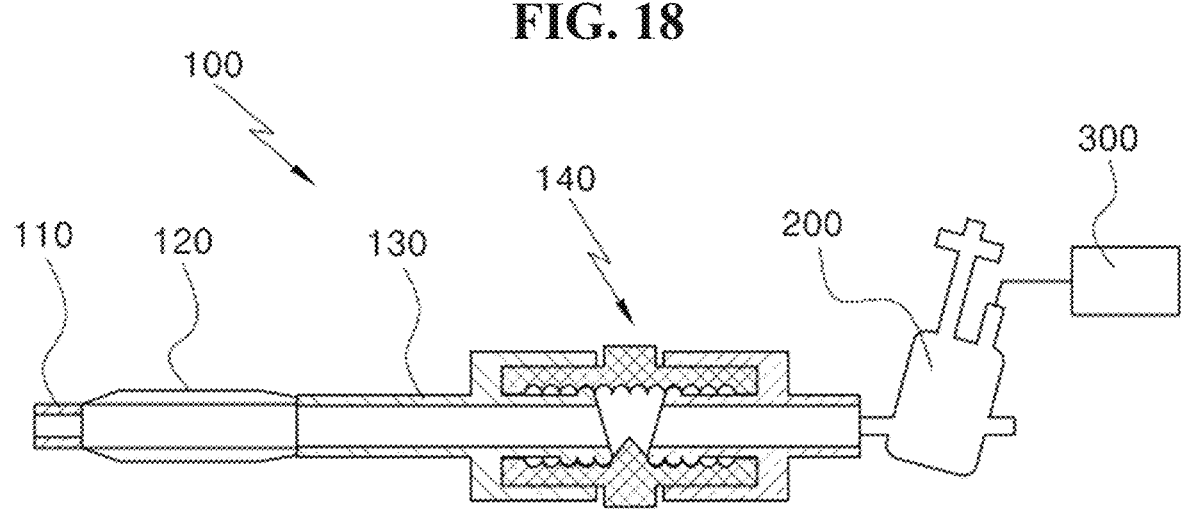
FIG. 18 is a schematic diagram illustrating an aspiration part according to the second embodiment of the present invention.
Figure 19:
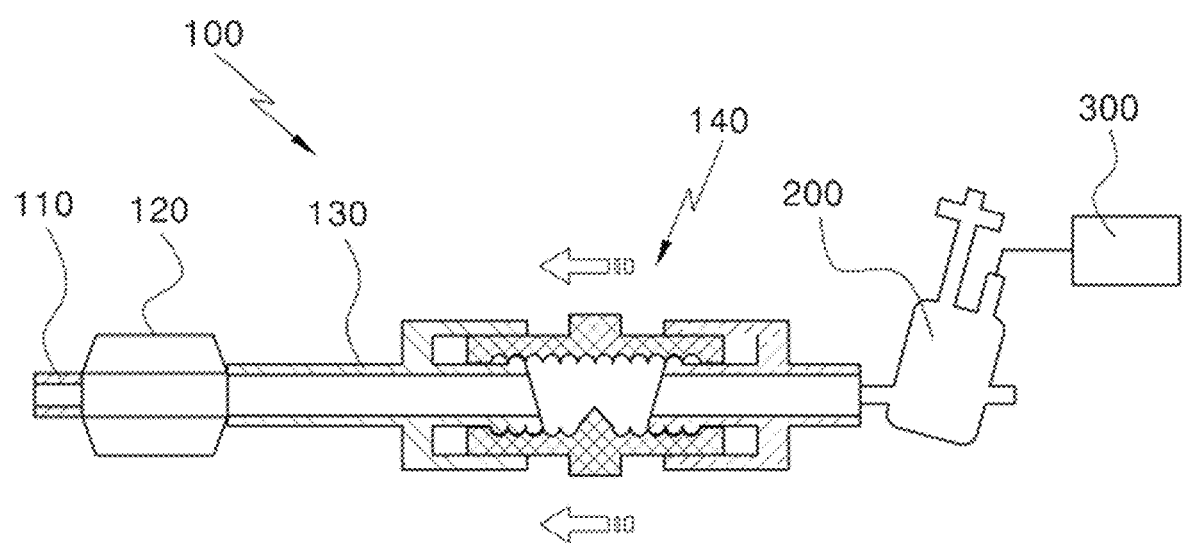
FIG. 19 is an operational diagram illustrating the operation of FIG. 18.
Figure 20:
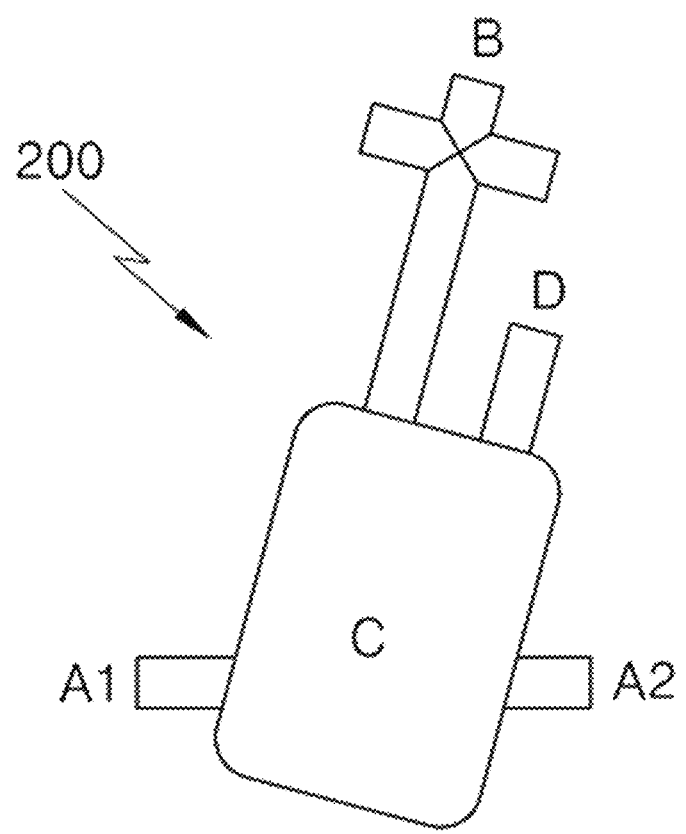
FIG. 20 is a schematic diagram illustrating a hub according to the second embodiment of the present invention.
Figure 21:
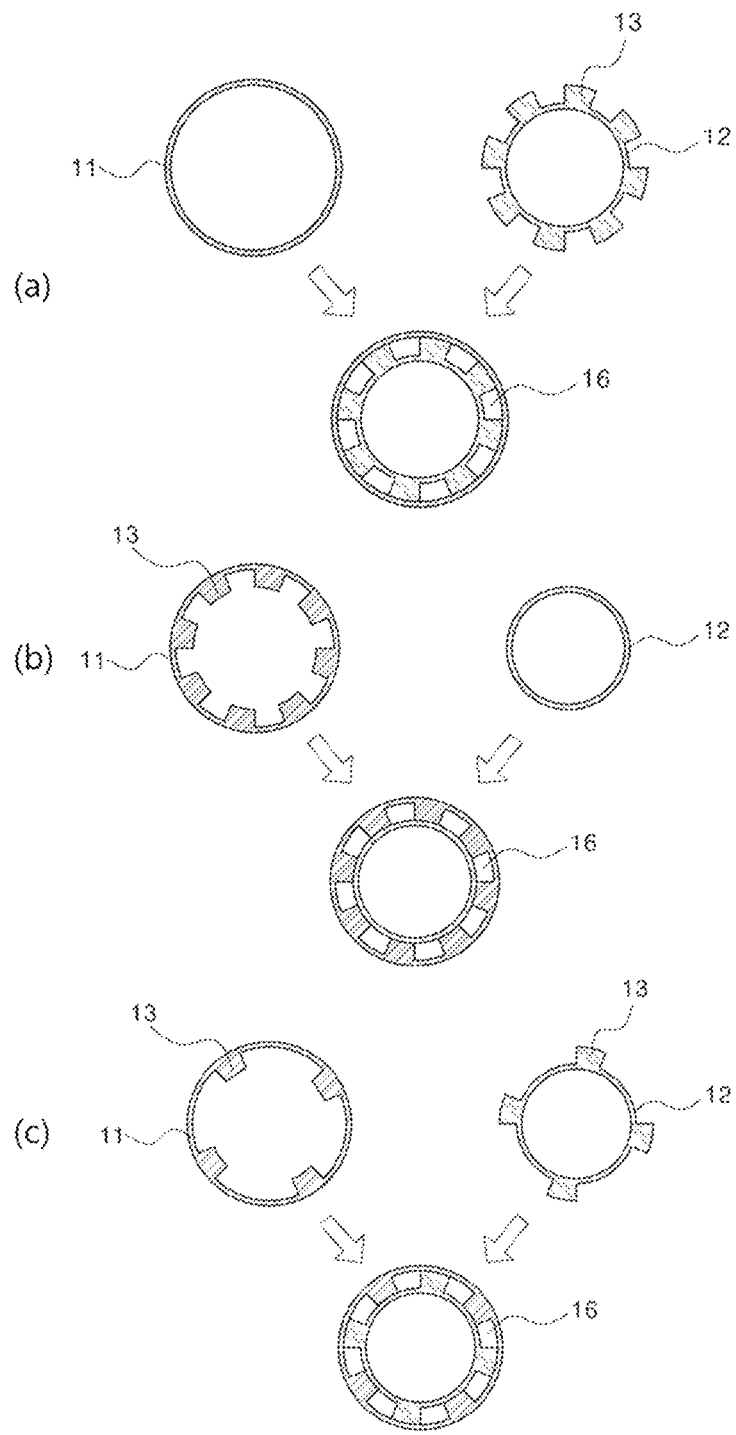
FIG. 21 is schematic diagrams illustrating various examples of the main body part according to the second embodiment of the present invention.

Furthermore, as illustrated in FIG. 17, the discharge holes 17 penetrate from the outside of the outer aspiration catheter 11 to the inside, and communicate with the spacing space 16 such that the microfluid transferred to the spacing space 16 is sprayed onto the thrombus 2 formed inside the blood vessel 1.

Moreover, on the outer surface of the outer aspiration catheter 11 where the connection part 13 is located, a plurality of inflow holes 18 are formed to allow the thrombus 2 that has been moved, deformed, and fragmented by the microfluidic to be introduced.

Here, as illustrated in FIG. 17, the inflow holes 18 penetrate vertically through the connection part 13 and the inner wall of the inner aspiration catheter 12 to the inner circumference of the inner aspiration catheter 12 from the outer surface of the outer aspiration catheter 11 to communicate with the inner side of the inner aspiration catheter 12, such that the thrombus 2 inhaled through the inflow holes 18 is transferred through the inside of the inner aspiration catheter 12 to the aspiration part and is discharged out of the body through the aspiration part.

Additionally, the connection parts 13 are formed between the inner surface of the outer aspiration catheter 11 and the outer surface of the inner aspiration catheter 12 to create the spacing space 16, in which the microfluid can be transferred, by spacing the outer aspiration catheter 11 and the inner aspiration catheter 12. The connection parts 13 are elongated in the length direction of the aspiration catheters 11 and 12, such that the plurality of connection parts 13 are formed to be spaced apart from each other in the circumferential direction of the aspiration catheters 11 and 12 and the spacing space 16 is formed between the aspiration catheters 11 and 12.

In addition, the front cover part 14 and the rear cover part 15 are formed between the outer aspiration catheter 11 and the inner aspiration catheter 12 to block the spacing space 16 through which the microfluid is transferred, and are respectively installed at the front and rear of the outer and inner aspiration catheters 11 and 12. The front cover part 14 and the rear cover part 15 are formed in a circular ring shape to fit the cylindrical outer and inner aspiration catheters 11 and 12.

Moreover, a connector 19 is formed on the rear surface of the rear cover part 15 to connect the microfluidic transfer tube 21 of the microflow circuit. One or more connectors 19 are formed according to the number of microfluidic transfer tubes 21 to be connected, and the connector 19 penetrates from the rear surface to the front surface of the rear cover part 15 to communicate with the spacing space 16.

Here, on the front surface of the rear cover part 15, a ring-shaped connection groove 19a is formed to evenly distribute the microfluid introduced into the plurality of spacing spaces 16 through the connector 19. The connector 19 communicates with One side of the connection groove 19a. The connection groove 19a communicates with the spacing space 16, such that the microfluid is transferred along the connection groove 19a and respectively delivered to the spacing space 16.

Figure 11:
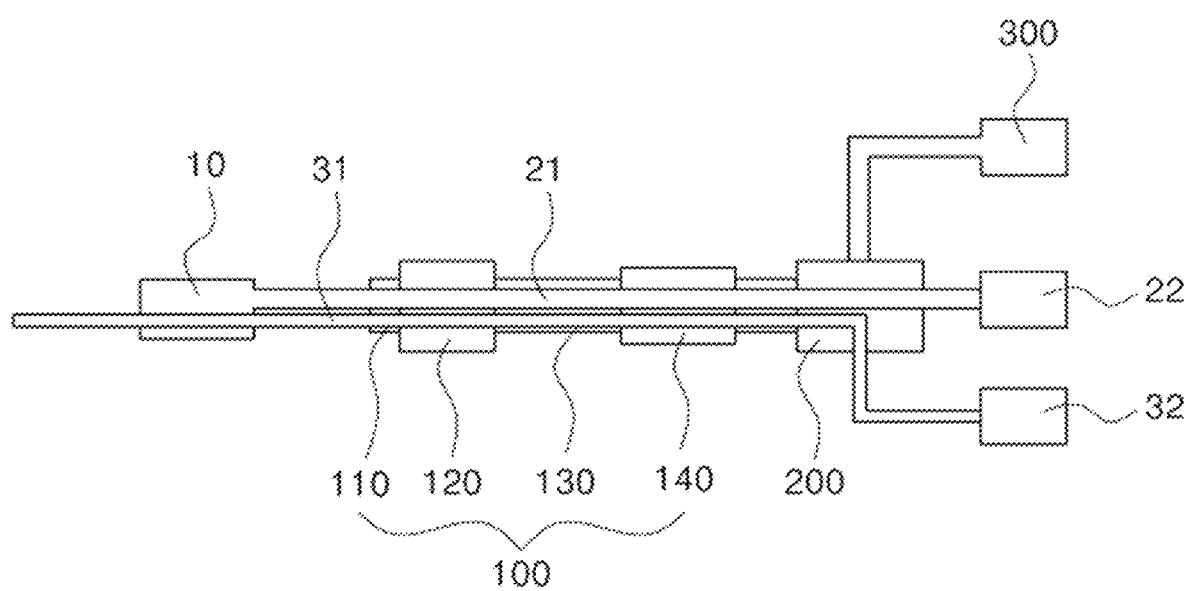
FIG. 11 is a schematic diagram illustrating a thrombus removal system according to a second embodiment of the present invention.
Figure 12:
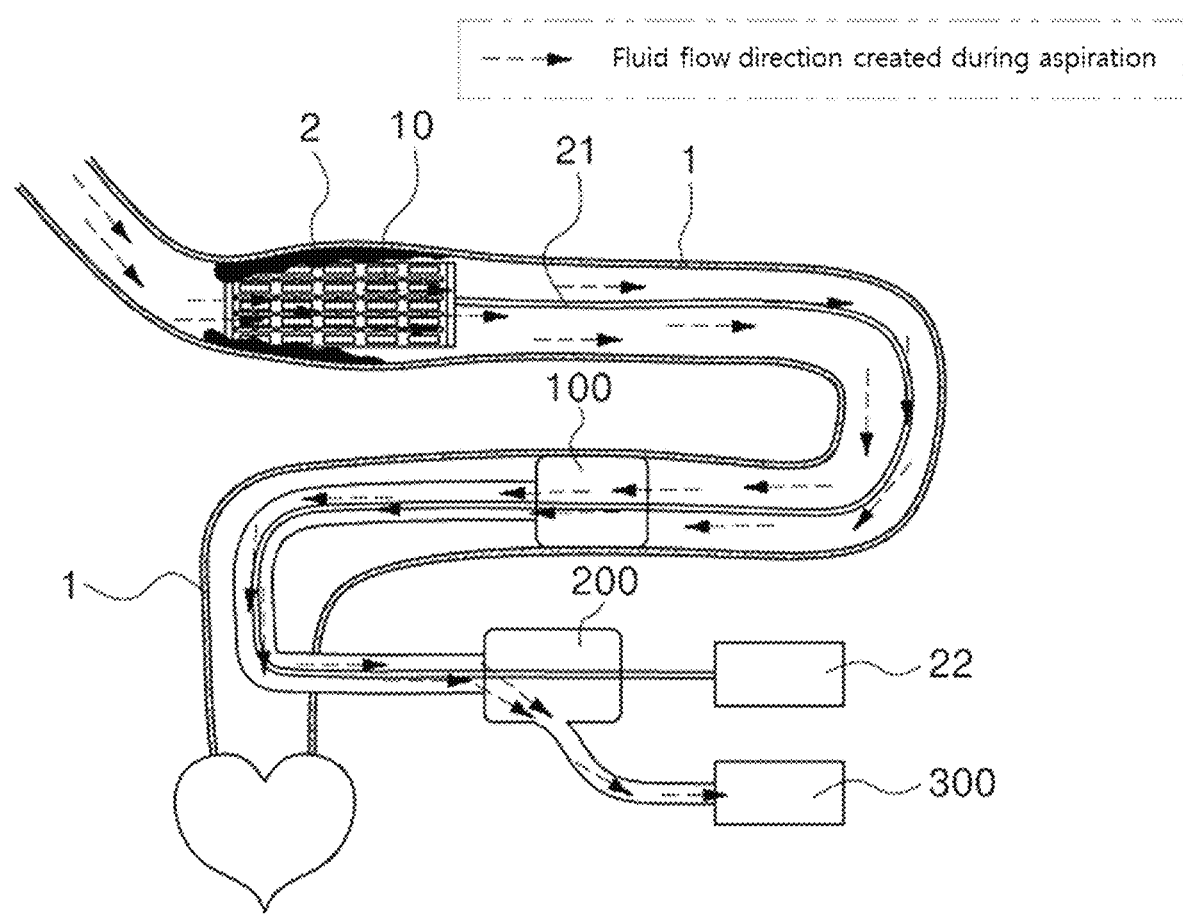
FIG. 12 is a schematic diagram illustrating the thrombus removal system installed inside a blood vessel according to the second embodiment of the present invention.
Figure 13:
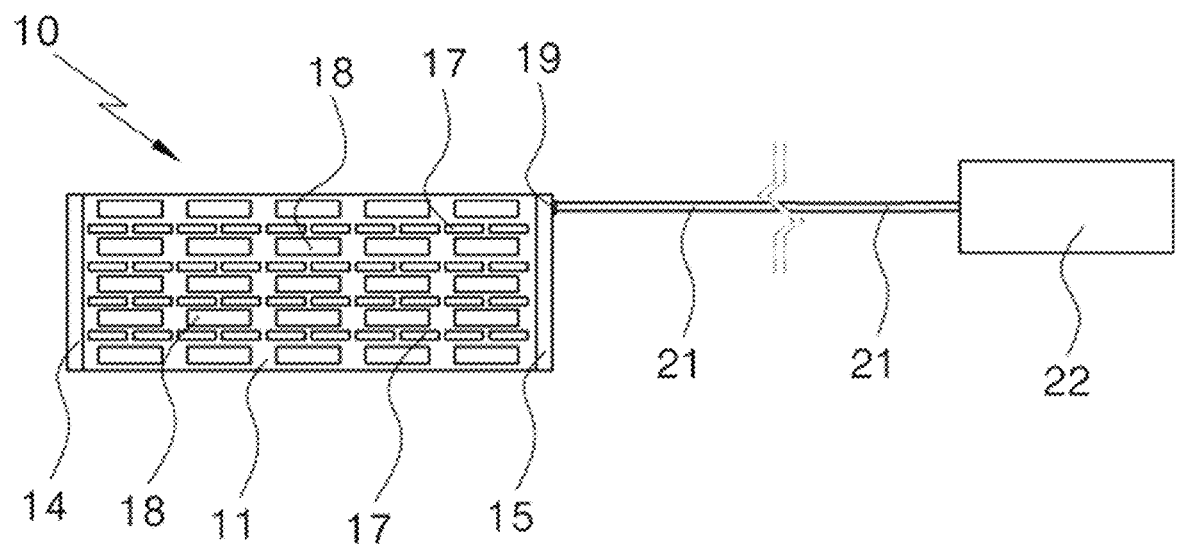
FIG. 13 is a front view illustrating a main body part and a microflow circuit part according to the second embodiment of the present invention.
Figure 14:
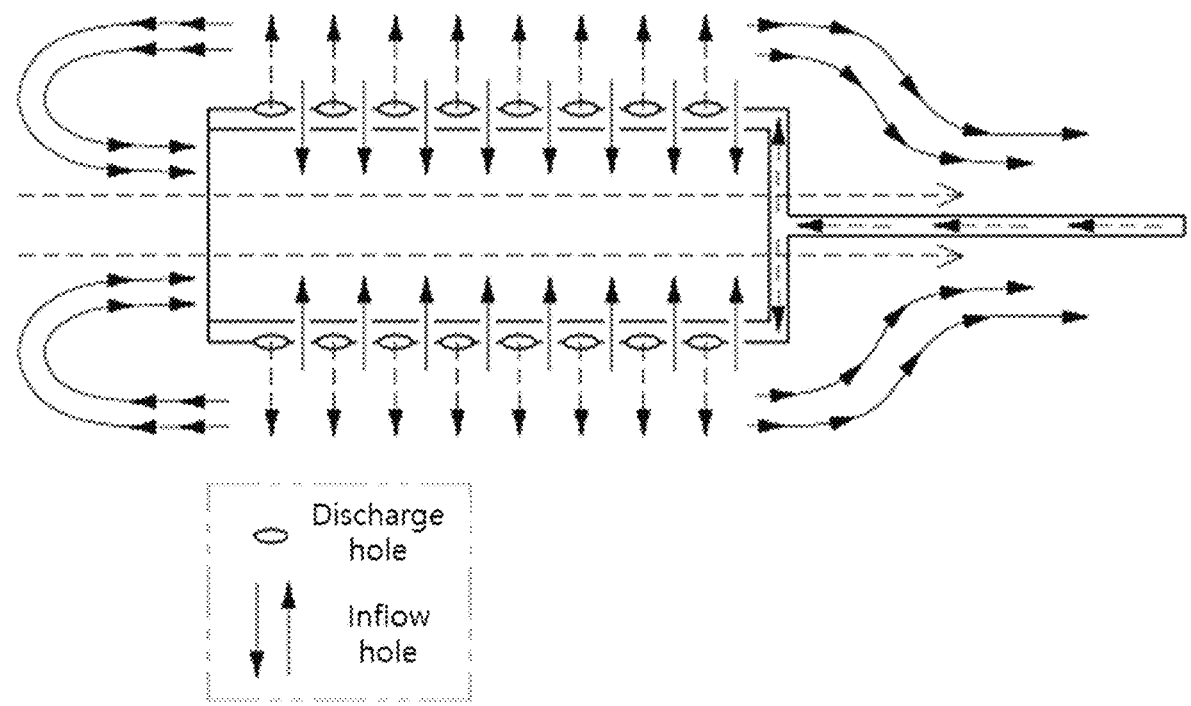
FIG. 14 is a conceptual view illustrating the main body part and the microflow circuit part according to the second embodiment of the present invention.
Figure 15:
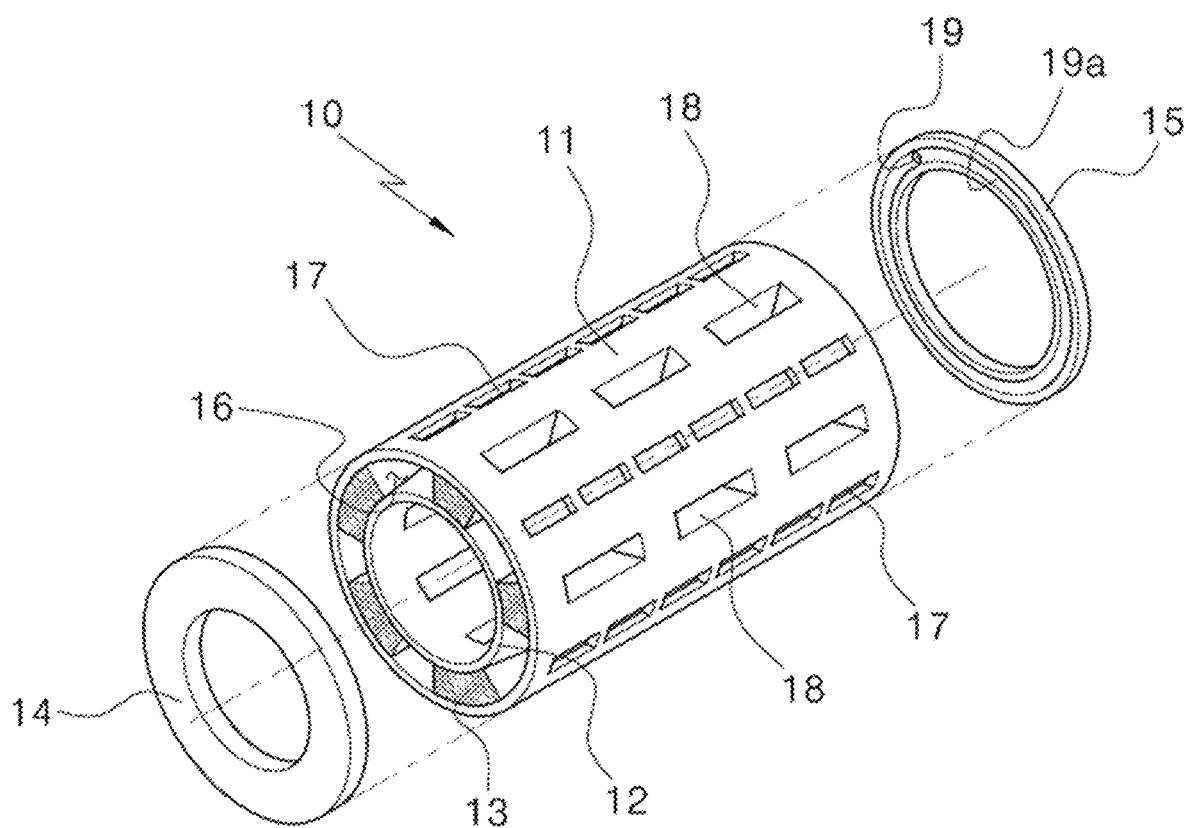
FIG. 15 is an exploded view illustrating the main body part according to the second embodiment of the present invention.
Figure 16:
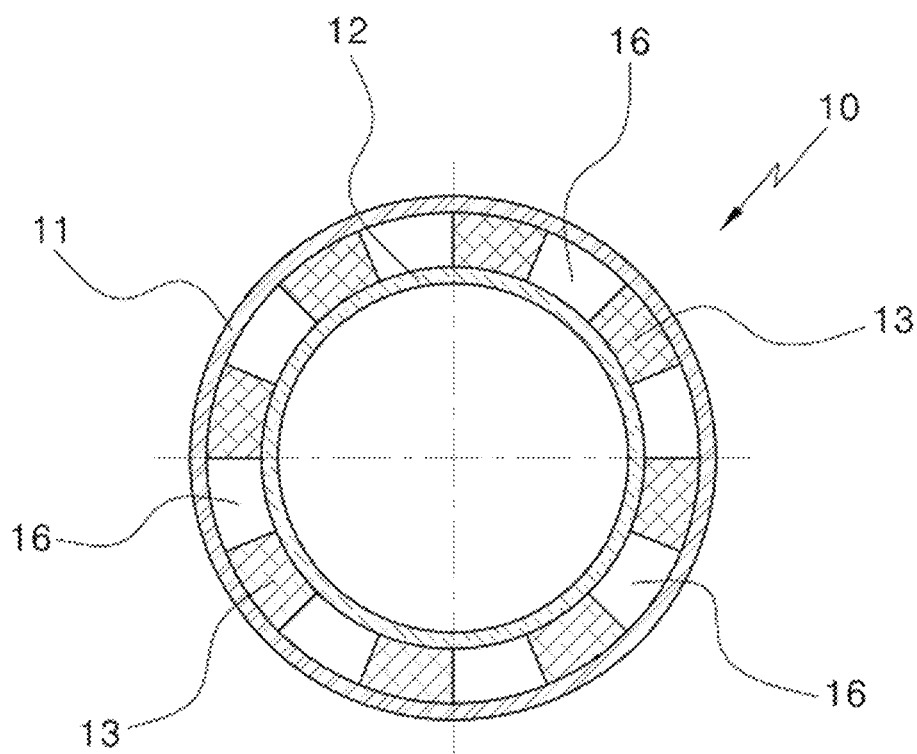
FIG. 16 is a vertical sectional view illustrating the main body part according to the second embodiment of the present invention.

The microflow circuit unit, as illustrated in FIGS. 11 through 13, is attached to the outer surface of the main body part 10 and provided to the exterior of the body, and includes a microfluidic transfer tube 21 and a microinjection pump 22 to create a microflow circuit to move, transform, and fragment the thrombus 2 by transferring microfluid.

Here, the microfluidic transfer tube 21 is attached to the rear cover part connector of the main body part 10 and extends to the exterior of the body along the inside of the aspiration part. The microfluid injected through the microinjection pump 22 is transferred inside the microfluidic transfer tube 21 and is sprayed onto the thrombus 2.

Furthermore, at least one microfluidic transfer tube 21 may be formed, or multiple microfluidic transfer tubes 21 may be formed according to the number of the rear cover part connectors, and the plurality of microfluidic transfer tubes 21 are provided to the exterior of the body along the inside of the aspiration part.

Furthermore, the microinjection pump 22 is connected to one end of the microfluidic transport tube 21 provided outside of the body, and adjusts to inject minute fluid into the microfluidic transport tube 21.

Here, the microinjection pump 22 is synchronized with an aspiration pump 300 of the aspiration part, such that when the microinjection pump 22 operates or the aspiration pump 300 operates, the microinjection pump 22 operates together with the aspiration pump simultaneously. In this instance, The reason for the simultaneous operation will be described below.

The aspiration part, as illustrated in FIGS. 11 to 12 and FIGS. 18 to 20, includes a guide catheter 100, a hub 200, and an aspiration pump 300, which are provided from the inside of the blood vessel 1 to the outside of the body, block the blood flow in the blood vessel 1 during the aspiration procedure, aspirate the thrombus 2 moved, deformed and fragmented by the microflow circuit part and transferred by the main body part 10, and discharge the thrombus to the outside.

The guide catheter 100 has one side located inside the blood vessel 1 to block the blood flow in the blood vessel 1, the other side located outside the blood vessel 1, an internal passage which guides the microfluidic transfer tube 21 and other endovascular devices, and an expansion part which expands to aspirate and remove thrombus, blood, and fluid when the blood flow is blocked. That is, the guide catheter 100 includes a tip 110, an expansion part 120 which is formed on one side of the tip 110 and can expand and contract to directly block inside the blood vessel 1, a body part 130 which is formed on one side of the expansion part 120 to induce the expansion and contraction of the expansion part 120, and a control part 140 which is formed on one side of the body part 130, is connected to the hub 200 on the other side, and drives the body part 130 left and right or back and forth to expand and contract the expansion part 120.

Here, the tip 110 of the guide catheter 100 is formed at the outermost end of the guide catheter 100 in a cylindrical shape, guides the microfluidic transfer tube 21 and other endovascular devices, and enables the aspiration and removal of thrombus, blood, and fluid. The tip 110 is formed in a cylindrical shape of which the diameter gets narrower or is constant toward the front of the the guide catheter 100 to facilitate navigation when advancing in the movement direction, and is made of flexible material, thereby making navigation through the blood vessel system easy.

Moreover, the expansion part 120 has a balloon section or expansion section, which is formed between the tip 110 and the body part 130 to be expandable to tightly adhere to the inner wall of the blood vessel 1, to block the blood vessel 1. The expansion part 120 has a frame, such as a strut or a wire, and an elastic membrane surrounding the frame. The front end of the strut structure of the expansion part 120 is fixed to the tip 110, and the rear end of the strut structure of the expansion part 120 is fixed to the body part 130. The expansion part 120 has a plurality of pins formed in the circumferential and longitudinal directions of a cylindrical shape and is made with a wire made of a superelastic shape memory alloy or titanium material. The wire is woven or crossed in the circumferential and longitudinal directions of a stent manufacturing jig to form a net shape having a plurality of spaces, thereby adjusting the length of the expansion part 120 in the back-and-forth direction, and expanding or contracting to change the outer diameter of the expansion part.

Furthermore, the body part 130 has a monorail formed on the inner wall (body wall) that allows the wire to slide. One end of the monorail wire is fixed to the expansion part 120 and the other end is fixed to the control part 140.

Additionally, the control part 140 has a toothed wheel that regulates the movement of the body part 130 moving along the wire, and is located between the body part 130 and the hub 200. In this instance, the toothed wheel operates the body part 130 back and forth while rotating helically and pushing and pulling the wire. At the same time, the expansion part 120 repeats expansion and contraction such that the diameter of the expansion part 120 gets larger and smaller while operating back and forth.

The hub 200 is connected to the end portion of the guide catheter 100 provided outside the body to connect various devices. The hub 200 is formed of a transparent material and is formed to connect a guide catheter port A1, a contrast and transfusion port B, an aspiration pump port D, a central chamber C, and a microflow circuit port A2. In this instance, a sensor which detects the presence or absence of air is further installed inside the hub 200, thereby allowing for the removal of air when detected by the sensor.

The aspiration pump 300 is connected to one side of the hub 200 to aspirate fluids, blood, and thrombus 2. During aspiration, the aspiration force is transmitted to the inside of the main body part 10, functioning as a negative pressure. The occlusion of blood flow caused by the expansion of the expansion part not only prevents the thrombus 2 from moving toward the proximal part of the blood vessel 1 but also provides a sealed space during the thrombus aspiration process so that negative pressure is stably transferred to the inner cavity of the main body part 10, thereby enabling the creation of a secondary fluid jet of the inflow holes 11.

Meanwhile, as illustrated in FIGS. 21a to 21c, the method of manufacturing the main body part 10 of the present invention will be described. The main body part 10 is manufactured in such a way that two concentric cylinders (outer aspiration catheter 11 and inner aspiration catheter 12) overlap each other as illustrated in FIG. 21a to form an empty space (spacing space 16) of an intermediate layer by a structure (connection part 13) protruding outward from the inner concentric circle (inner aspiration catheter 12) or an empty space (spacing space 16) of an intermediate layer by a structure (connection part 13) protruding inward from the outer concentric circle (outer aspiration catheter 11) as illustrated in FIG. 21*b*).

Alternatively, as illustrated in FIG. 21*c*, the main body part 10 is manufactured in such a way that an empty space (spacing space 16) of an intermediate layer is formed by a structure (connection part 13) formed by protruding outward from the inner concentric circle (inner aspiration catheter 12) and a structure (connection part 13) formed by protruding inward from the outer concentric circle (outer aspiration catheter 11).

Figure 23:
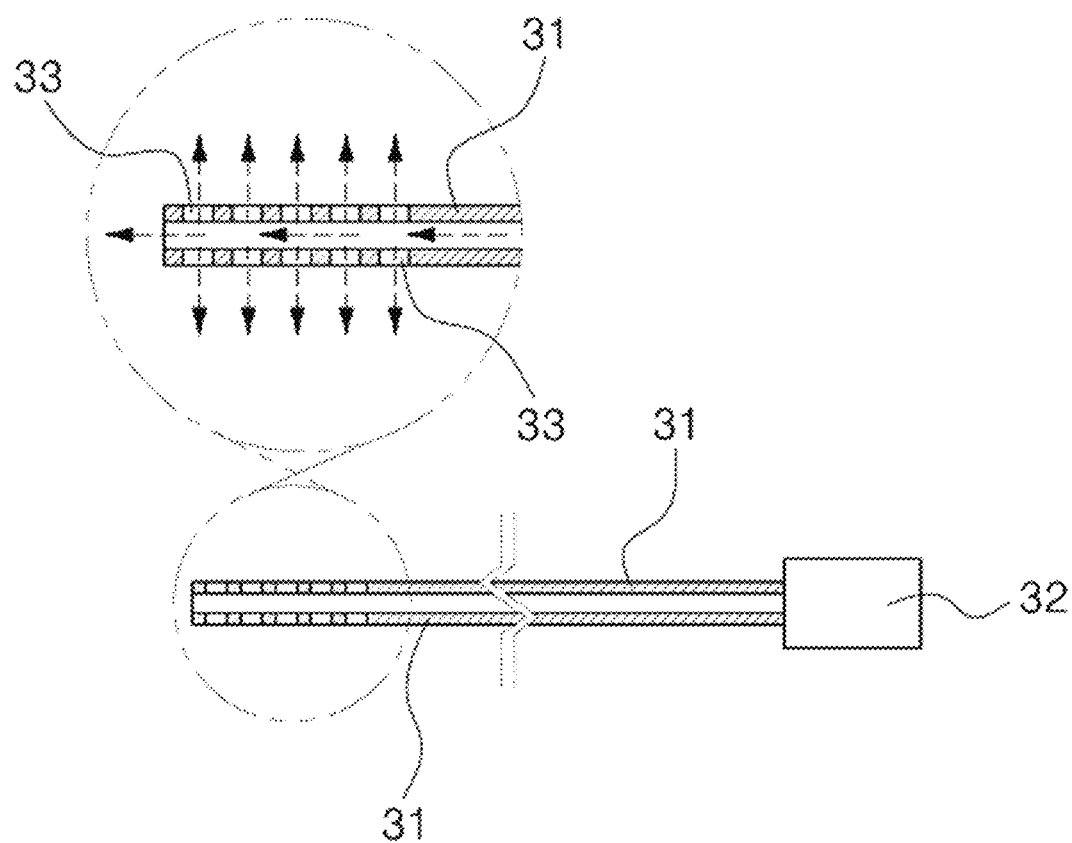
FIG. 23 is a sectional view illustrating a microwire part according to the second embodiment of the present invention.

As illustrated in FIGS. 11 and 23, the microwire part is arranged to pass through the interior of the main body part 10 and extend to the exterior of the body, and includes a microwire 31 which sprays a microfluid into the blood vessel 1 to assist the revascularization of the blood flow and the creation of flow in the microflow circuit, and a fluid injection pump 32.

Here, the microwire 31 extends from the interior of the main body part 10 to the exterior of the body along the inner part of the aspiration part. A plurality of spray holes 33 are formed at the end that penetrates the interior of the main body part 10 to spray the microfluid transferred into the blood vessel 1. The plurality of spray holes 33 are formed on the entire end surface and circumference of the microwire 31 to allow multi-directional microfluid spray.

In addition, the fluid injection pump 32 is connected to one end of the microwire 31 arranged on the exterior of the body to inject and move the microfluid into the microwire 31. The fluid injection pump 32 is synchronized with the microinjection pump 22 of the microflow circuit and the aspiration pump 300 of the aspiration part so as to operate simultaneously when the microinjection pump 22 or the aspiration pump 300 operates.

Figure 22:
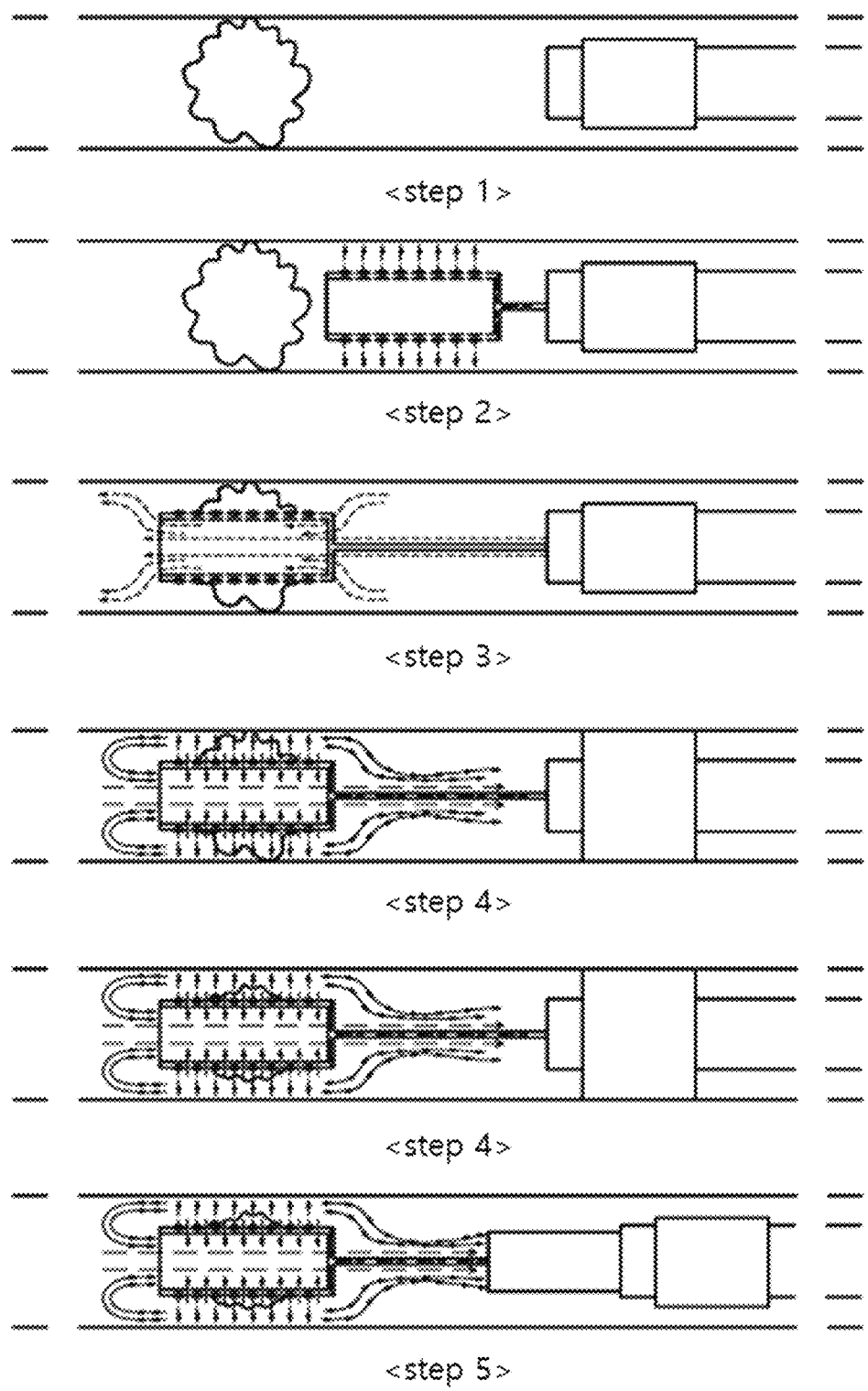
FIG. 22 is a step diagram illustrating an operation method of the thrombus removal system according to the second embodiment of the present invention.

Hereinafter, the operation method of the thrombus removal system described above will be described in detail step by step with reference to FIG. 22.

Step 1) Installation of Guide Catheter

In order to remove the thrombus 2 occluding the blood vessel 1, the distal expansion guide catheter 100 is positioned at an entrance of a target blood vessel 1.

Step 2) Microfluid Supply and Advancement Within Blood Vessel

As a preparation step for removal of a thrombus 2, a fluid is supplied from the microinjection pump 22 to make the surface of the thrombus removal system hydrophilic. The fluid supply status and amount of the microflow circuit is adjusted to prevent the thrombus removal system from being adhered to the wall of the blood vessel 1, to maintain the thrombus removal system positioned inside the blood vessel 1, and to advance the thrombus removal system with low friction to reach the target blood vessel section. The thrombus removal system has a distal portion which is more flexible than a proximal portion to facilitate the navigation/advancement/manipulation of the thrombus removal system through the vascular system.

The thrombus removal system is moved forward after being inserted through the inside of the guide catheter 100, such that the main body part 10 and the microflow circuit part are moved outward, advancing out of the guide catheter 100. The thrombus removal system is advanced concentrically with the guide wire, or approaches the target blood vessel section using reduced friction by the fluid supply control of the fluid flow circuit.

Step 3) Immediate Endovascular Revascularization (Endovascular Flow Bypass)

The thrombus removal system is inserted into the distal expansion guide catheter 100 and advances to the blood vessel section occluded by the thrombus 2. As soon as the thrombus removal system is positioned in the thrombus section, the thrombus 2 is pushed into a space between the thrombus removal system and the blood vessel wall, and immediate endovascular revascularization occurs through an inner cavity of the thrombus removal system. When the functional region of the device to cover the entire part of the thrombus 2 is positioned, the thrombus 2 blocking the blood vessel 1 can be displaced to the side of the blood vessel wall. The thrombus 2 pushed by the functional region of the thrombus removal system positioned in the thrombus section is trapped (displaced) in the space between the thrombus removal system and the blood vessel wall. Meanwhile, the blood flow occupying the center of the cross-section of the blood vessel 1 passes through the entire part of the thrombus 2.

Step 4) Generation and Action of Microfluidic Circuit

In a state in which the outer diameter of the expansion part 120 of the guide catheter 100 is increased to stop the blood flow, the synchronized microinjection pump 22 and aspiration pump 300 operate to create a microfluidic circuit. The fluid, such as saline, injected from the microinjection pump 22 moves through the microfluidic tube 21 of the support region to the microfluidic tube 21 of the functional region, and is sprayed into the space between the thrombus removal system and the blood vessel wall through the discharge holes 23 of the microfluidic tube 21.

At this time, when the fluid injection system operates the microinjection pump 22 to inject the fluid, the fluid pressure is transmitted to the discharge holes 23 through the microfluidic tube 21. The fluid such as saline flows along the microfluidic tube 21, and the microfluid transferred through the microfluidic transfer tube 21 is transferred to the spacing space of the main body part 10, and then, is sprayed into the space between the thrombus removal system and the blood vessel wall while a fluid jet is generated through the discharge holes 17 of the outer aspiration catheter.

Due to the jet stream generated on the outer surface of the thrombus removal system/physiological saline jet through the discharge holes 23, the thrombus meets with an increase in the moisture content of the thrombus, changes in viscoelasticity, deformation, wear, division, and the likes. Correspondingly, the thrombus removal system generates aspiration force through the guide catheter 100 of the aspiration part and moves the thrombus, which has been reduced in size due to deformation, wear, etc., along along the jet stream and fluid circuit created through the plurality of inflow holes 11 and discharge holes 23 provided between the inner and outer cavities of the thrombus removal system to deform and aspirate the thrombus much more. The thrombus is deformed sequentially and gradually removed while moving along the microfluidic circuit.

Moreover, the aspiration pump 300 operates simultaneously corresponding to the microinjection pump 22. The aspiration pump 300 connected to the guide catheter 100 performs a continuous aspiration, and negative pressure occurs throughout the path of the blood vessel 1 and the inner cavity of the thrombus removal system. Due to the negative pressure, the physiological saline (fluid) injected by the microinjection pump 22 enters the inner cavity of the thrombus removal system through the inflow holes 11 of the main body part 10, and at this time, the finely broken thrombus 2 is simultaneously aspirated into the aspiration pump 300 through the guide catheter 100.

Here, the thrombus 2 is torn and gets smaller while being pushed out from the discharge holes 23 or sucked into the inflow holes 11 by the jet fluid, and moves. To enhance aspiration force, the outer diameter of the guide catheter 100 is increased, such as by expansion of the expansion part 120, and the outer wall of the guide catheter 100 is in close contact with the inner wall of the vessel 1 to stop the flow, thereby creating a closed space.

In a state in which the blood flow is stopped, the aspiration from the aspiration pump 300 connected to the hub 200 is started, and the generated negative pressure propagates to the central tube cavity of the thrombus removal system. The negative pressure in the inner cavity of the guide catheter 100 creates a fluid jet in the inward direction of the microfluidic transfer tube 21, thereby forming a microfluidic circuit. The negative pressure in the inner cavity of the thrombus removal system creates a fluid jet between the outer and inner cavities of the main body part 10 through the inflow hole 11, thereby inducing fragmentation and movement of the thrombus 2. The thrombus 2 along the fluid jet becomes fragmented and miniaturized, and is stuck in the inflow holes 11 while moving, thereby being fragmented or being deformed to be smaller to pass and move through the holes.

Step 5) Recovery of Thrombus Removal System

To finish the aspiration process through the microcircuit, the thrombus removal system, which was positioned in the blood vessel section coaxially with the guide catheter 100, is slowly recovered from the body while simultaneously executing the aspiration of the microinjection pump 22 and the aspiration of the aspiration pump 300. To provide continuous effective aspiration force of the microflow circuit, an additional aspiration catheter is installed coaxially inside the guide catheter 100, is positioned at the thrombus section, and is connected to the aspiration pump 300, such that the aspiration catheter and the thrombus removal system can be slowly removed from the body as one unit. Such a method has the advantage of being able to recover the thrombus removal system while maintaining a microfluidic circuit due to the synchronized operation of the microinjection pump 22 and the aspiration pump 300 throughout the entire recovery process.

Hereafter, a thrombus removal system according to a third embodiment of the present invention will be described with reference to the attached drawings.

As illustrated in FIGS. 24 to 34, the thrombus removal system having a maze partition capable of creating an endovascular revascularization and a microflow circuit includes a thrombus removal device, a local vascular wall drug delivery device, and a local vascular wall body fluid collection device.

As illustrated in FIGS. 24 to 34, the thrombus removal device 400 is a device for removing a thrombus 2 that has occurred inside a vessel 1, and includes a main body part 10, a microflow circuit part, an aspiration part, and a microwire part.

As illustrated in FIGS. 24 to 30, the main body part 10 is positioned and installed along the blood vessel 1 to be located in the blood vessel 1 blocked by the thrombus, and generates revascularization in the blood vessel 1. For aspiration of the thrombus, the main body part induces the thrombus 2 moved, deformed and fragmented through creation of the creation of a microfluidic circuit in a halted blood flow state, and then, transfers the thrombus toward the aspiration part. In this instance, the main body part 10 is made of a soft material capable of minimizing damage of the blood vessel 1 or a material, such as a Nitinol alloy, with self-expansion properties.

Here, the main body part 10 includes: an outer tube 11 which has a cylindrical shape and of which both end portions and a hollow interior are penetrated; an inner tube 12 which has a cylindrical shape to be provided within the outer tube 11 and is formed to be spaced apart from the inner surface of the outer tube 11 to form a space; and a maze partition 13 which is formed vertically in the spacing space between the outer tube 11 and the inner tube 12 to block the penetrated both end portion of the spacing space and to guide the microfluid of the microflow circuit part transferred to the spacing space in multiple directions.

Moreover, the cylindrical outer tube 11 and inner tube 12 are formed to have varying diameters, getting narrower at the front and wider towards the rear in the movement direction. The maze partition 13 is designed to block the spacing space penetrated by both ends of the cylindrical outer tube 11 and inner tube 12, and the maze partition 13 in the spacing space is formed in a circular ring shape to block the spacing space.

Moreover, multiple maze partitions 13 are formed in the spacing space to partition the spacing space into multiple sections, and the multiple space sections partitioned by the maze partition 13 have different functions in each spacing space. Here, the multiple space sections are divided into a plurality of discharge spaces 14 which discharge the microfluid transferred from the microflow circuit part to the outside of the main body part 10, and a plurality of penetration spaces 15 into which the thrombus 2 moved, transformed, and fragmented by the microfluidic is introduced, and then, is transferred to the inside of the inner tube 12. In this instance, the plurality of penetration spaces 15 are partitioned by the maze partition 13 to be formed between the plurality of discharge spaces 14.

Figure 30:
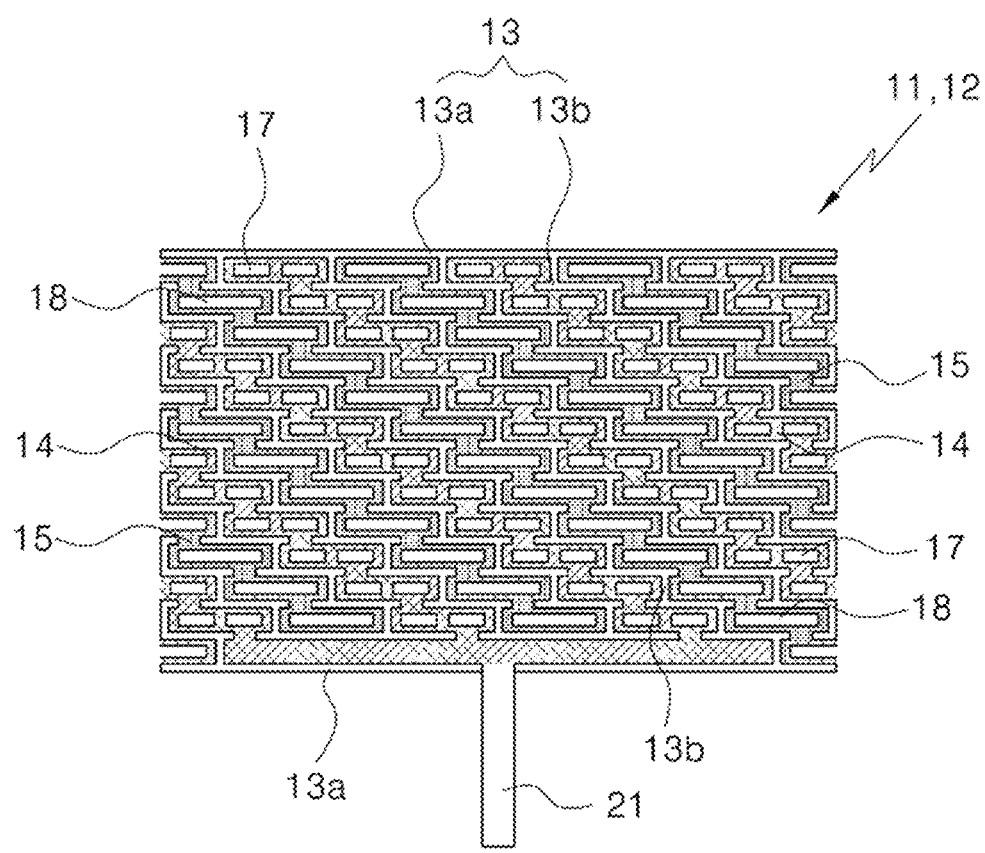
FIG. 30 is a plan view illustrating the expanded main body part according to the third embodiment of the present invention.
Figure 31:
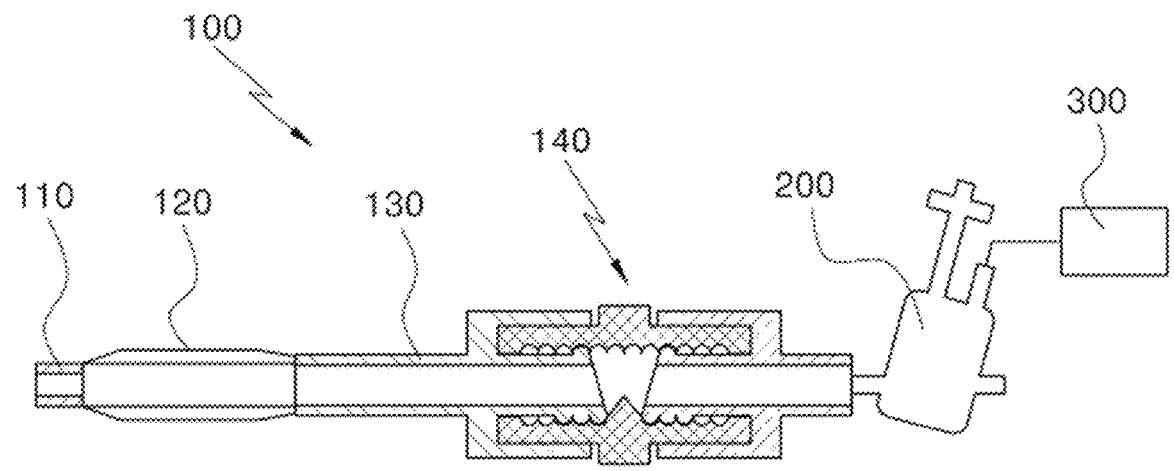
FIG. 31 is a schematic diagram illustrating an aspiration part according to the third embodiment of the present invention.
Figure 32:
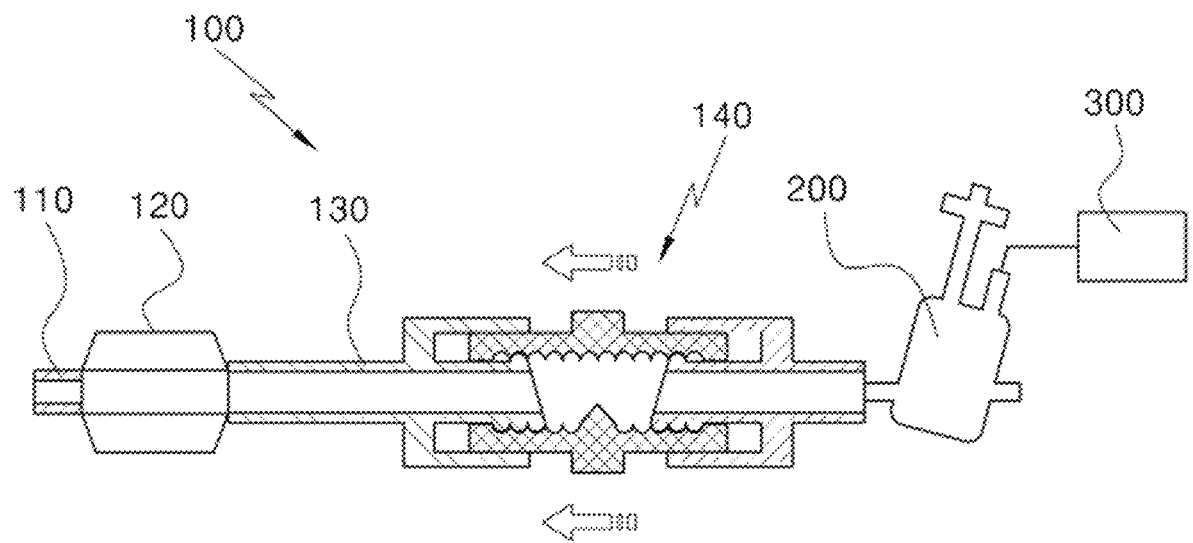
FIG. 32 is an operational diagram illustrating the operation of FIG. 31.
Figure 33:
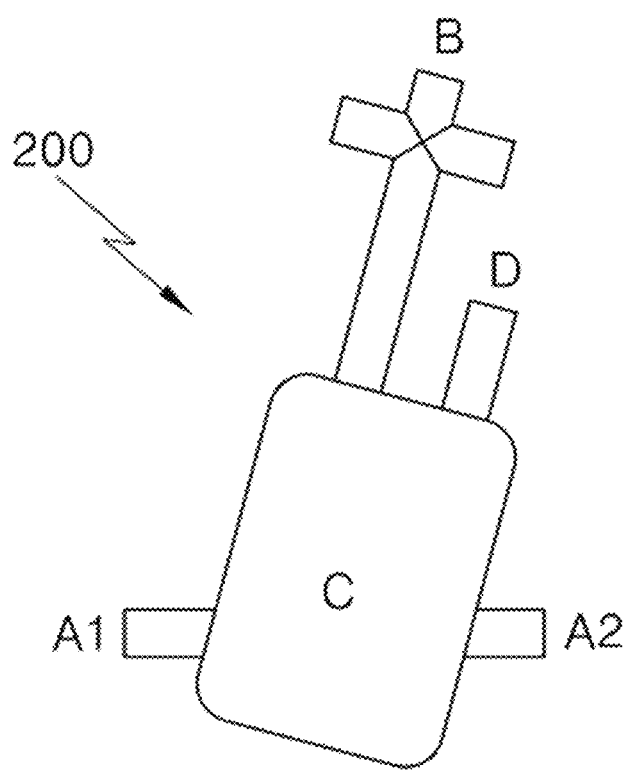
FIG. 33 is a schematic diagram illustrating a hub according to the third embodiment of the present invention.

As illustrated in FIG. 30, when viewed flatly, the maze partition 13 is formed in a zigzag pattern such that the microfluid can be transferred in various directions, such that the microfluid can be sprayed uniformly and can be sprayed uniformly to the outside through the discharge holes 17. In this instance, the maze partition 13 has various flat forms so that the microfluid can be transferred in various directions.

As described above, the maze partition 13 includes an outer maze partition 13a which blocks the spacing space penetrated by both ends of the cylindrical outer tube 11 and inner tube 12, and an inner maze partition 13b which is formed in the spacing space to partition the spacing space into a plurality of discharge spaces 14 and penetration spaces 15. In this instance, the outer maze partition 13a which is located on the rear surfaces of the cylindrical outer and inner tubes 11 and 12 is connected to the microfluidic transfer tube 21 of the microflow circuit part to communicate with the microfluidic transfer tube 21 such that the microfluid of the microflow circuit part is transferred to the discharge spaces 14.

Figure 29:
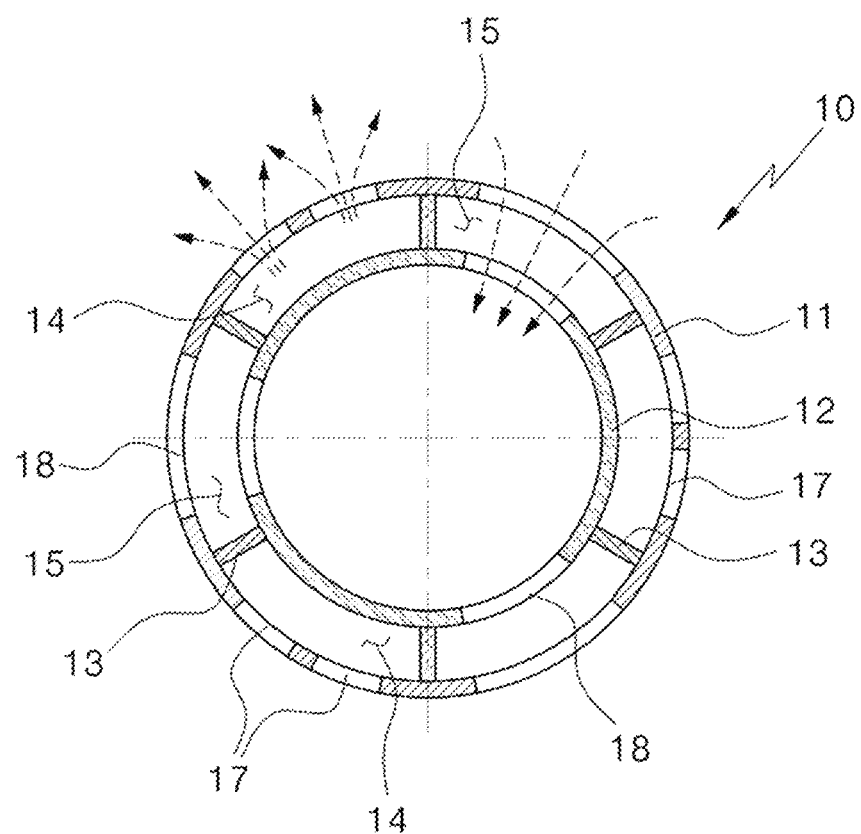
FIG. 29 is a vertical sectional view illustrating the main body part according to the third embodiment of the present invention.

Here, as illustrated in FIGS. 29 and 30, the microfluid from the microflow circuit part entering through the outer maze partition 13a is formed to be blocked by the inner maze partition 13b so it is not transferred to the penetration space 15, thereby ensuring the microfluidic is transferred only to the discharge spaces 14.

Meanwhile, on the outer surface of the outer tube 11, where the discharge space 14 is located, multiple discharge holes 17 which communicate with the discharge space 14 are formed, such that the microfluid transferred to the discharge space 14 is sprayed onto the thrombus 2 inside the vessel 1.

Furthermore, on the outer surface of the outer tube 11, where the penetration space 15 of the spacing space is located, multiple inflow holes 18 are formed so that thrombus 2 moved, deformed, and fragmented by the microfluid is introduced.

Moreover, the inflow holes 18 penetrate vertically through the outer surface of the outer tube 11 and the inner tube 12 located in the penetration space 15 to communicate with the inside of the inner tube 12, namely, are formed on the same vertical line of the outer tube 11 and the inner tube 12, with the penetration space 15 located in between. In this manner, the moved, deformed, and fragmented thrombus 2 introduced through the inflow holes 18 passes through the inner tube 12 and is transferred to the aspiration part through the inside of the inner tube 12, and then, is discharged out of the body via the aspiration part.

The microflow circuit part, as illustrated in FIGS. 24 to 28, is attached to the end of the main body part 10 and extends to the exterior of the body, and includes a microfluidic transfer tube 21 and a microinjection pump 22 to create a microflow circuit which moves, deforms, and fragments the thrombus 2.

The microflow circuit part can basically be a circuit resulting from the flow of physiological saline, but can include a microflow circuit for a fluid with added anticoagulants, such as antiplatelet agents such as tirofiban, abciximab, and the like, anticoagulants such as heparin, or thrombolytic agents such as tissue plasminogen activator (tPA) and urokinase.

Here, the microfluidic transfer tube 21 is attached to communicate with the outer maze partition 13a of the main body part 10 and extends along the inner side of the aspiration part to the exterior of the body. The microfluid injected through the microinjection pump 22 is transferred into the microfluidic transfer tube 21, and is sprayed to the thrombus 2.

Moreover, at least one microfluidic transfer tube 21 may be formed, or multiple microfluidic transfer tubes 21 may be formed according to the number of the rear cover part connectors, and the plurality of microfluidic transfer tubes 21 are provided to the exterior of the body along the inside of the aspiration part.

Furthermore, the microinjection pump 22 is connected to one end of the microfluidic transport tube 21 provided outside of the body, and adjusts to inject minute fluid into the microfluidic transport tube 21.

Here, the microinjection pump 22 is synchronized with an aspiration pump 300 of the aspiration part, such that when the microinjection pump 22 operates or the aspiration pump 300 operates, the microinjection pump 22 operates together with the aspiration pump simultaneously. In this instance, The reason for the simultaneous operation will be described below.

The aspiration part, as illustrated in FIGS. 1 to 2 and FIGS. 7 to 9, includes a guide catheter 100, a hub 200, and an aspiration pump 300, which are provided from the inside of the blood vessel 1 to the outside of the body, block the blood flow in the blood vessel 1 during the aspiration procedure, aspirate the thrombus 2 moved, deformed and fragmented by the microflow circuit part and transferred by the main body part 10, and discharge the thrombus to the outside.

The guide catheter 100 has one side located inside the blood vessel 1 to block the blood flow in the blood vessel 1, the other side located outside the blood vessel 1, an internal passage which guides the microfluidic transfer tube 21 and other endovascular devices, and an expansion part which expands to aspirate and remove thrombus, blood, and fluid when the blood flow is blocked. That is, the guide catheter 100 includes a tip 110, an expansion part 120 which is formed on one side of the tip 110 and can expand and contract to directly block inside the blood vessel 1, a body part 130 which is formed on one side of the expansion part 120 to induce the expansion and contraction of the expansion part 120, and a control part 140 which is formed on one side of the body part 130, is connected to the hub 200 on the other side, and drives the body part 130 left and right to expand and contract the expansion part 120.

Here, the tip 110 of the guide catheter 100 is formed at the outermost end of the guide catheter 100 in a cylindrical shape, guides the microfluidic transfer tube 21 and other endovascular devices, and enables the aspiration and removal of thrombus, blood, and fluid. The tip 110 is formed in a cylindrical shape of which the diameter gets narrower or is constant toward the front of the the guide catheter 100 to facilitate navigation when advancing in the movement direction, and is made of flexible material, thereby making navigation through the blood vessel system easy.

Moreover, the expansion part 120 has a balloon section or expansion section, which is formed between the tip 110 and the body part 130 to be expandable to tightly adhere to the inner wall of the blood vessel 1, to block the blood vessel 1. The expansion part 120 has a frame, such as a strut or a wire, and an elastic membrane surrounding the frame. The front end of the strut structure of the expansion part 120 is fixed to the tip 110, and the rear end of the strut structure of the expansion part 120 is fixed to the body part 130. The expansion part 120 has a plurality of pins formed in the circumferential and longitudinal directions of a cylindrical shape and is made with a wire made of a superelastic shape memory alloy or titanium material. The wire is woven or crossed in the circumferential and longitudinal directions of a stent manufacturing jig to form a net shape having a plurality of spaces, thereby adjusting the length of the expansion part 120 in the back-and-forth direction, and expanding or contracting to change the outer diameter of the expansion part.

Furthermore, the body part 130 has a monorail formed on the inner wall (body wall) that allows the wire to slide. One end of the monorail wire is fixed to the expansion part 120 and the other end is fixed to the control part 140.

Additionally, the control part 140 has a toothed wheel that regulates the movement of the body part 130 moving along the wire, and is located between the body part 130 and the hub 200. In this instance, the toothed wheel operates the body part 130 back and forth while rotating helically and pushing and pulling the wire. At the same time, the expansion part 120 repeats expansion and contraction such that the diameter of the expansion part 120 gets larger and smaller while operating back and forth.

The hub 200 is connected to the end portion of the guide catheter 100 provided outside the body to connect various devices. The hub 200 is formed of a transparent material and is formed to connect a guide catheter port A1, a contrast and transfusion port B, an aspiration pump port D, a central chamber C, and a microflow circuit port A2. In this instance, a sensor which detects the presence or absence of air is further installed inside the hub 200, thereby allowing for the removal of air when detected by the sensor.

The aspiration pump 300 is connected to one side of the hub 200 to aspirate fluids, blood, and thrombus 2. During aspiration, the aspiration force is transmitted to the inside of the main body part 10, functioning as a negative pressure. The occlusion of blood flow caused by the expansion of the expansion part not only prevents the thrombus 2 from moving toward the proximal part of the blood vessel 1 but also provides a sealed space during the thrombus aspiration process so that negative pressure is stably transferred to the inner cavity of the main body part 10, thereby enabling the creation of a secondary fluid jet of the inflow holes 11.

Figure 24:
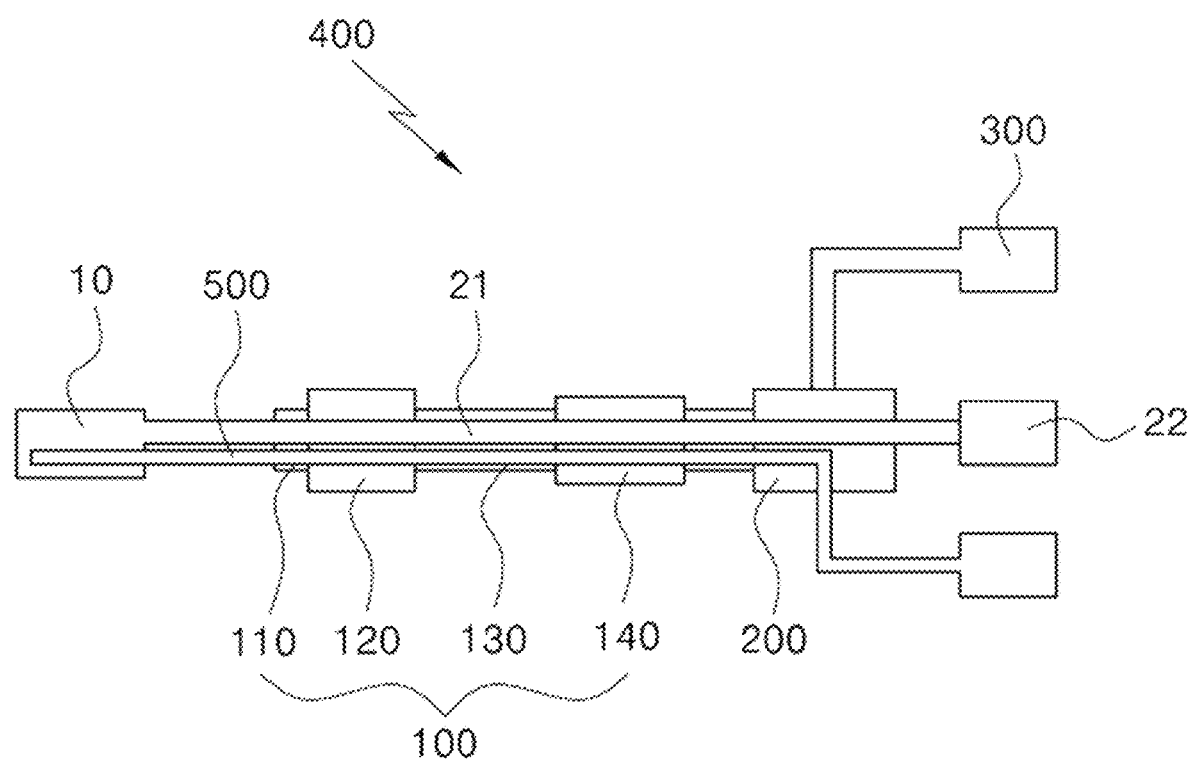
FIG. 24 is a schematic diagram illustrating a configuration of a vascular device according to a third embodiment of the present invention.
Figure 25:
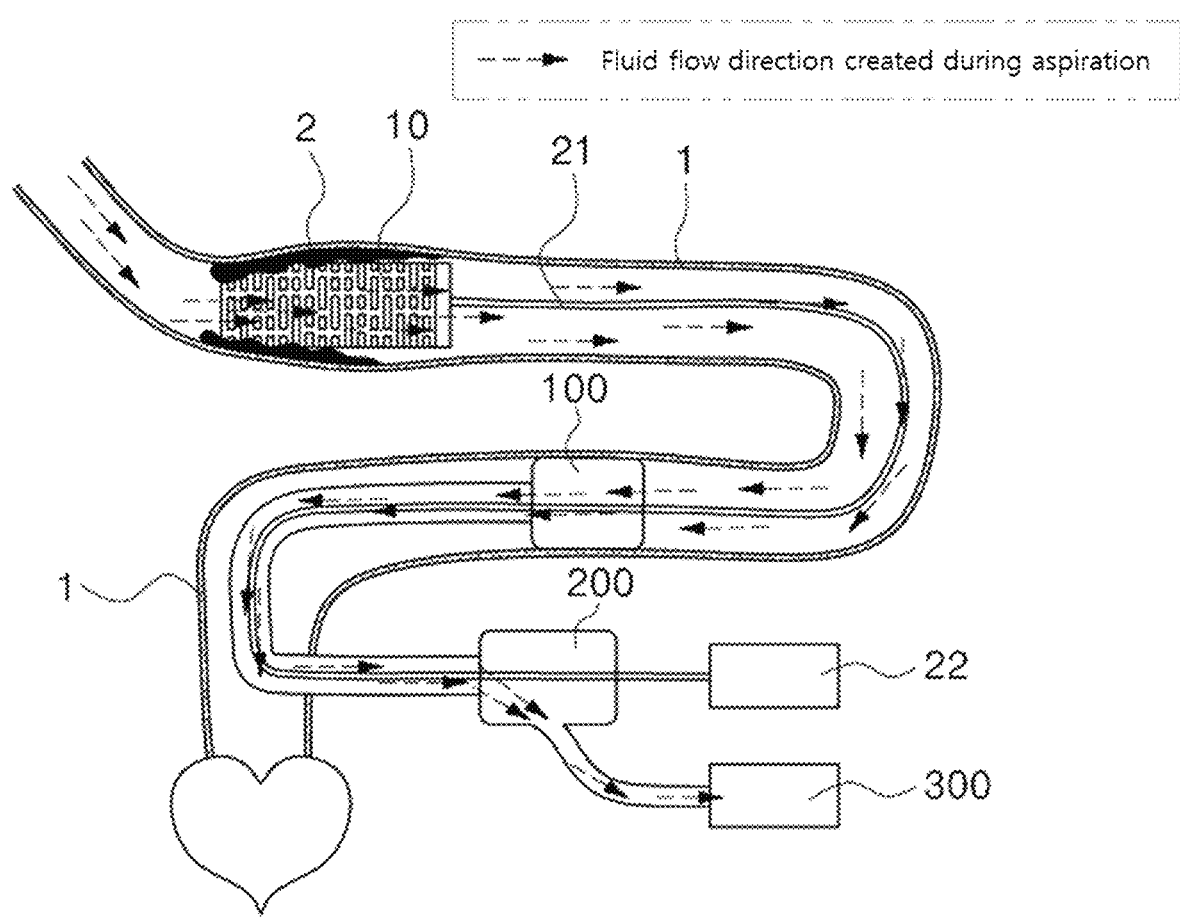
FIG. 25 is a schematic diagram illustrating the vascular device installed inside a blood vessel to operating when installed and operated inside a blood vessel according to the third embodiment of the present invention.
Figure 26:
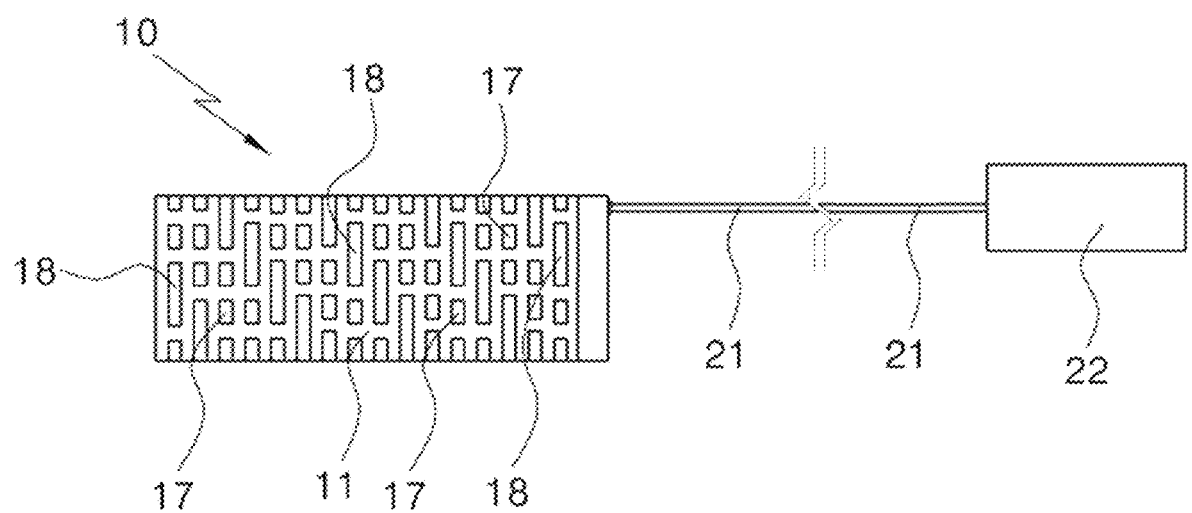
FIG. 26 is a front view illustrating a main body part and a microflow circuit part according to the third embodiment of the present invention.
Figure 27:
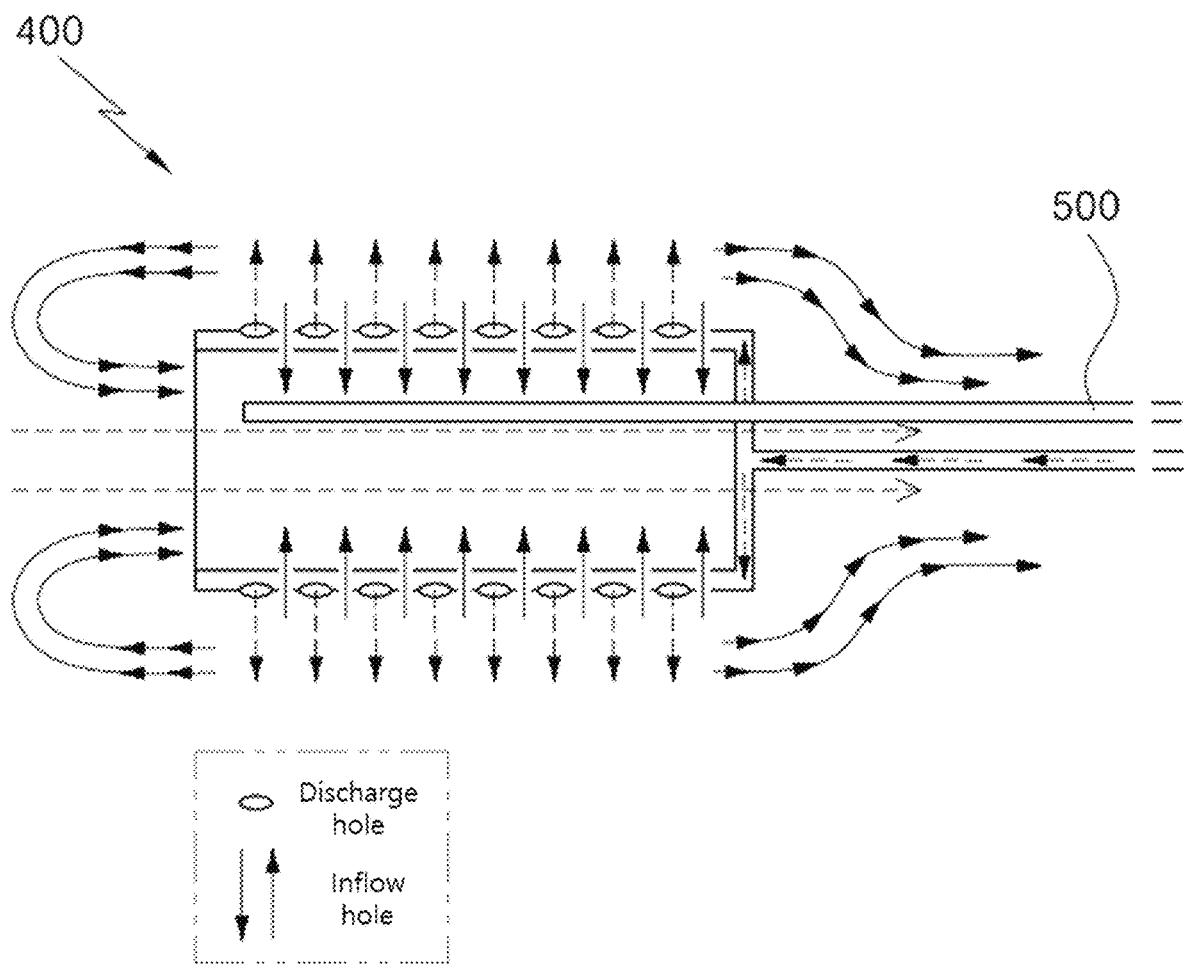
FIG. 27 is a conceptual view illustrating the operation of the main body part and the microflow circuit part according to the third embodiment of the present invention.
Figure 28:
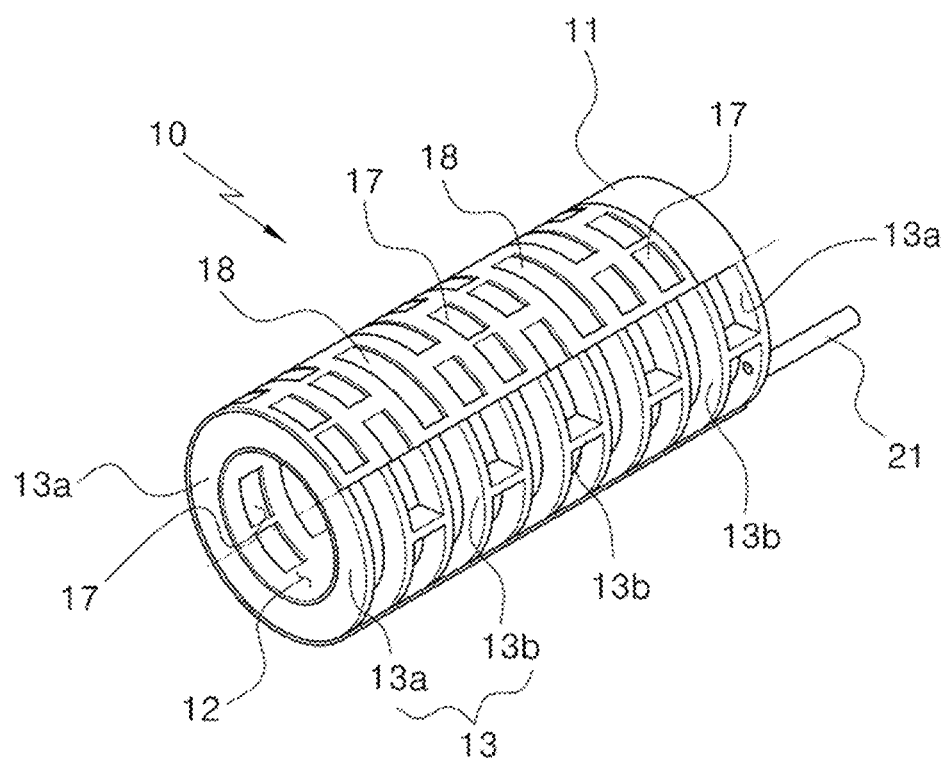
FIG. 28 is a sectional view illustrating the main body part according to the third embodiment of the present invention.

The localized vascular wall drug delivery device 500, as illustrated in FIGS. 24 and 27, makes high-concentration drugs or cells stay on the vascular wall through the microfluidic circuit created without interruption of the blood flow, thereby effectively delivering drugs onto a local vascular wall.

Here, in vascular diseases such as atherosclerosis, vascular dissection, and cerebral aneurysms, the localized vascular wall drug delivery device 500 can locally deliver the high-concentration drugs or cells to the corresponding vascular walls. For instance, in the case of a vascular occlusion and the thrombus formation at a vascular segment due to the rupture of an atherosclerotic plaque, since platelet activation and aggregation continue to occur, the revascularization cannot be maintained just by the thrombus removal, so additional balloon angioplasty, stent insertion, and the administration of antiplatelet agents are required.

Moreover, in the case of acute cerebral infarction, there is a limitation in use of thrombolytics and antiplatelet drugs due to the weakened blood-brain barrier. Therefore, in many cases, it is impossible to inject antiplatelet agents necessary for inserting a permanent stent and maintaining patency since it is necessary to reduce the risk of hemorrhagic transformation. It is possible to locally and accurately inject the agents to the vascular wall at a determined speed and volume by loading antiplatelet agents (tirofiban, abciximab), anticoagulant agents (heparin, NOAC), thrombolytics (tPA (tissue Plasminogen Activator), urokinase), and stent restenosis prevention drugs (paclitaxel, rapamycin) in the fluid injection pump which opens through the outer directional holes of a porous device.

Furthermore, the localized vascular wall drug delivery device 500 allows high-concentration drugs or cells to stay on the vascular wall through the microfluidic circuit created without interruption of the blood flow. Consequently, it is possible to locally deliver drugs onto the vascular wall. In the case of vascular diseases such as atherosclerosis, vascular dissection, and cerebral aneurysms, the localized vascular wall drug delivery device 500 locally delivers the high-concentration drugs or cells to the corresponding vascular wall.

Meanwhile, for the purpose of obtaining vascular wall imaging, iodine nanoparticles (CT imaging), or gadolinium nanoparticles, or iron oxide nanoparticles (MRI imaging) with ligand binding capable of being specifically bound to thrombin-rich thrombus or vascular wall inflammation-related peptides are injected through the fluid injection pump at predetermined injection speed and volume to obtain a three-dimensional vascular wall image. The three-dimensional vascular wall imaging plays a role in precise diagnosis, post-treatment response evaluation, and prognosis prediction for pathophysiological diagnosis of the vascular wall in atherosclerotic plaque, arterial dissection, cerebral aneurysms, etc.

The localized vascular wall fluid sampling and component analysis device 500, as illustrated in FIGS. 24 and 27, is a device for localized vascular wall fluid sampling and component analysis and drug delivery, and may be a porous revascularization and microflow circuit creation device, or a porous device such as a porous microwire or the like. The localized vascular wall fluid sampling and component analysis device 500 for analysis of intercellular transfer substances is positioned in the artery or the vein to perform localized vascular wall fluid sampling and component analysis, thereby enabling research on intercellular signaling systems through the analysis of intercellular signaling substances collected. If the intercellular transfer substances at the vascular wall are analyzed through techniques such as microdialysis and exosome microarray, the type and dosage of the administered drugs can be adjusted.

Here, a fluid, such as physiological saline, PBS, etc., is injected through a microinjection path to perform cleaning, and the fluid delivered through the outward hole remains in an outer cavity space of the porous device for a predetermined period of time. In this instance, the transfer substances (e.g., exosomes, microRNA, cytokines, peptides) of the vascular wall are dissolved in the injected saline.

In addition, the outer cavity space of the porous device is a space between the functional region of the device and the vascular wall, and the intercellular transfer materials may potentially exist. Small amounts of cell transfer materials can be dissolved in the injected fluid to be collected, and it can reflect the pathophysiological status.

Typically, after collecting intercellular transfer materials such as exosomes, paracrine hormones, neurotransmitter, and cytokines, they are recovered through the microinjection path, and the type and amount of intercellular transfer materials can be measured to evaluate the pathoecological status of the vascular wall.

Additionally, a fluid, such as physiological saline, PBS, etc., is injected through a microinjection path to perform cleaning, and the fluid delivered through the outward hole remains in an outer cavity space of the porous device for a predetermined period of time, and is dissolved in the injected saline.

As described above, the device according to the present invention can have multiple microflow circuits that open outer directional holes. For instance, physiological saline is injected through the microflow circuit opening a first outer directional hole, and remains therein. Through the microfluidic circuit opening a second outer directional hole, physiological saline stagnated in the space between the device and the vascular wall is collected and analyzed for the type and amount of intercellular transfer materials in an external analysis machine. Through the synchronization of the multiple microfluidic circuits, in the revascularized state in the blood vessel, physiological saline or drugs can be positioned for the predetermined period of time in a dynamic equilibrium state without proximal loss or embolus in the space between the device and the vascular wall.

Here, through localized vascular wall fluid sampling and component analysis, it is possible to determine the type and dosage of drugs to be locally administered to the vascular wall. For instance, a first fluid injection path is used for saline injection, and a second fluid injection path is used for sample collection, to analyze intercellular signaling substances from the vascular wall region through techniques like microdialysis and exosome microarrays, and to adjust the type and dosage of the administered drugs in real time or chronologically, in the case of thrombotic vascular occlusion due to a rupture of atherosclerotic plaques, the concentrations of platelet function enhancement, atherosclerosis-related cytokines, inflammation-related peptides such as matrix metalloproteinase (MMP), elastase, and myeloperoxidase, and thrombosis-inducing thrombin are measured in real time or chronologically to to determine the dosage and speed of platelet inhibitors, anti-inflammatoires, stem cell preparations, and thrombolytics.

In addition, through the local vascular wall fluid collection and compositional analysis, it is possible not only to track pathological changes but also to determine the type and dosage of administered drugs. For instance, among the plurality of fluid injection paths, two fluid injection paths can be used for physiological saline injection, and two can be used for sample collection.

Furthermore, the speed/pressure/amount of each of the fluid injection paths and aspiration paths are adjusted so that they are balanced, and finally, it is possible to perform localized vascular wall fluid collection, component analysis, and localized vascular wall drug delivery through the fluid circuit.

Figure 34:
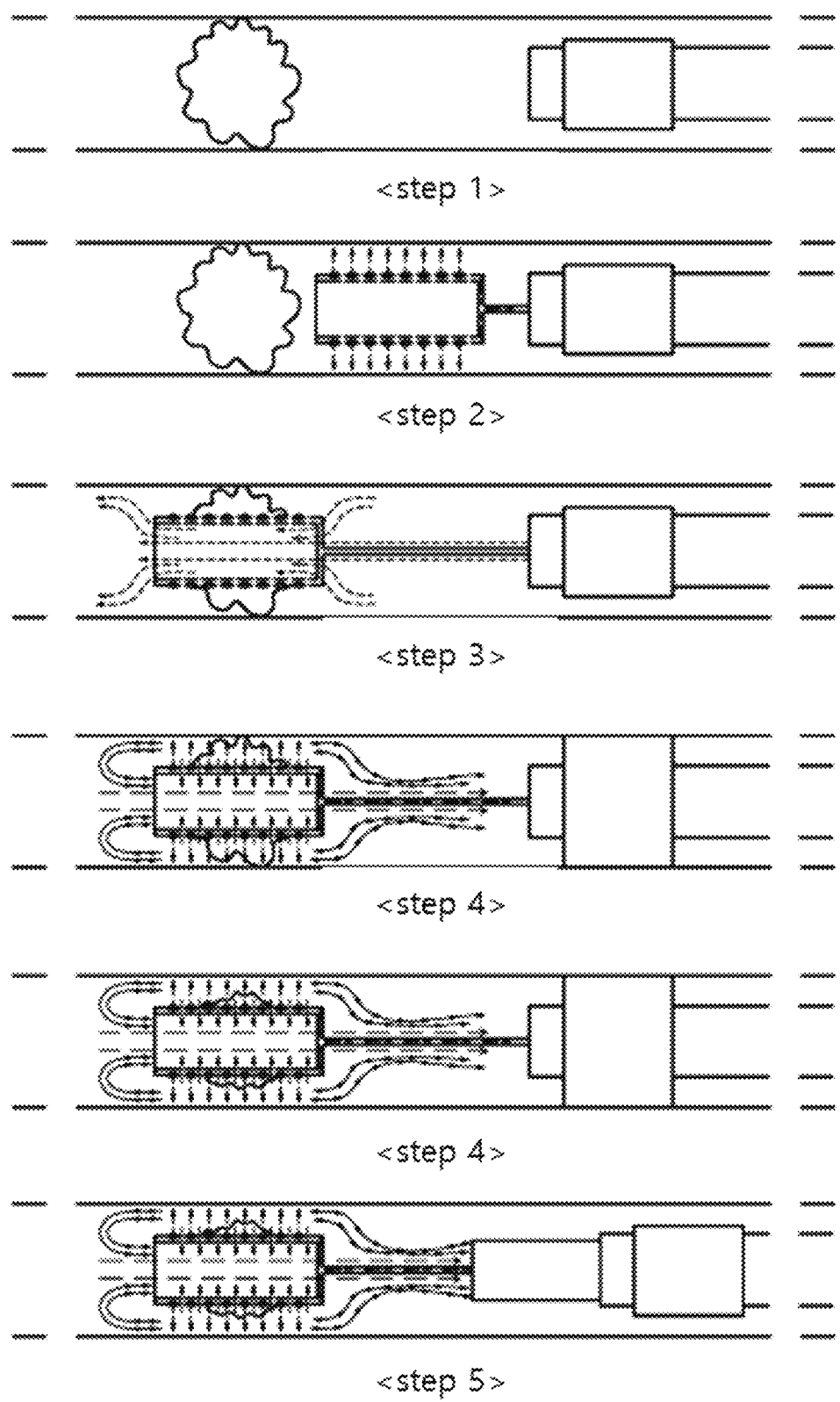
FIG. 34 is a step diagram illustrating an operation method of the thrombus removal system according to the third embodiment of the present invention.

Hereafter, the operation method of the thrombus removal device of the present invention described above will be described in detail step by step with reference to FIG. 34.

Step 1) Installation of Guide Catheter

In order to remove the thrombus 2 occluding the blood vessel 1, the distal expansion guide catheter 100 is positioned at an entrance of a target blood vessel 1.

Step 2) Microfluid Supply and Advancement within Blood Vessel

As a preparation step for removal of a thrombus 2, a fluid is supplied from the microinjection pump 22 to make the surface of the vascular device hydrophilic. The fluid supply status and amount of the microflow circuit is adjusted to prevent the vascular device from being adhered to the wall of the blood vessel 1, to maintain the vascular device positioned inside the blood vessel 1, and to advance the vascular device with low friction to reach the target blood vessel section. The vascular device has a distal portion which is more flexible than a proximal portion to facilitate the navigation/advancement/manipulation of the vascular device through the vascular system.

The vascular device is moved forward after being inserted through the inside of the guide catheter 100, such that the main body part 10 and the microflow circuit part are moved outward, advancing out of the guide catheter 100. The vascular device is advanced concentrically with the guide wire, or approaches the target blood vessel section using reduced friction by the fluid supply control of the fluid flow circuit.

Step 3) Immediate Endovascular Revascularization (Endovascular Flow Bypass)

The vascular device is inserted into the distal expansion guide catheter 100 and advances to the blood vessel section occluded by the thrombus 2. As soon as the vascular device is positioned in the thrombus section, the thrombus 2 is pushed into a space between the vascular device and the blood vessel wall, and immediate endovascular revascularization occurs through an inner cavity of the vascular device. When the functional region of the device to cover the entire part of the thrombus 2 is positioned, the thrombus 2 blocking the blood vessel 1 can be displaced to the side of the blood vessel wall. The thrombus 2 pushed by the functional region of the vascular device positioned in the thrombus section is trapped (displaced) in the space between the vascular device and the blood vessel wall. Meanwhile, the blood flow occupying the center of the cross-section of the blood vessel 1 passes through the entire part of the thrombus 2.

Step 4) Generation and Action of Microfluidic Circuit

In a state in which the outer diameter of the expansion part 120 of the guide catheter 100 is increased to stop the blood flow, the synchronized microinjection pump 22 and aspiration pump 300 operate to create a microfluidic circuit. The fluid, such as saline, injected from the microinjection pump 22 moves through the microfluidic tube 21 of the support region to the microfluidic tube 21 of the functional region, and is sprayed into the space between the vascular device and the blood vessel wall through the discharge holes 23 of the microfluidic tube 21.

At this time, when the fluid injection system operates the microinjection pump 22 to inject the fluid, the fluid pressure is transmitted to the discharge holes 23 through the microfluidic tube 21. The fluid such as saline flows along the microfluidic tube 21, and the microfluid transferred through the microfluidic transfer tube 21 is transferred to the spacing space of the main body part 10, and then, is sprayed into the space between the vascular device and the blood vessel wall while a fluid jet is generated through the discharge holes 17 of the outer aspiration catheter.

Due to the jet stream generated on the outer surface of the vascular device/physiological saline jet through the discharge holes 23, the thrombus meets with an increase in the moisture content of the thrombus, changes in viscoelasticity, deformation, wear, division, and the likes. Correspondingly, the vascular device generates aspiration force through the guide catheter 100 of the aspiration part and moves the thrombus, which has been reduced in size due to deformation, wear, etc., along along the jet stream and fluid circuit created through the plurality of inflow holes 11 and discharge holes 23 provided between the inner and outer cavities of the vascular device to deform and aspirate the thrombus much more. The thrombus is deformed sequentially and gradually removed while moving along the microfluidic circuit.

Moreover, the aspiration pump 300 operates simultaneously corresponding to the microinjection pump 22. The aspiration pump 300 connected to the guide catheter 100 performs a continuous aspiration, and negative pressure occurs throughout the path of the blood vessel 1 and the inner cavity of the vascular device. Due to the negative pressure, the physiological saline (fluid) injected by the microinjection pump 22 enters the inner cavity of the vascular device through the inflow holes 11 of the main body part 10, and at this time, the finely broken thrombus 2 is simultaneously aspirated into the aspiration pump 300 through the guide catheter 100.

Here, the thrombus 2 is torn and gets smaller while being pushed out from the discharge holes 23 or sucked into the inflow holes 11 by the jet fluid, and moves. To enhance aspiration force, the outer diameter of the guide catheter 100 is increased, such as by expansion of the expansion part 120, and the outer wall of the guide catheter 100 is in close contact with the inner wall of the vessel 1 to stop the flow, thereby creating a closed space.

In a state in which the blood flow is stopped, the aspiration from the aspiration pump 300 connected to the hub 200 is started, and the generated negative pressure propagates to the central tube cavity of the vascular device. The negative pressure in the inner cavity of the guide catheter 100 creates a fluid jet in the inward direction of the microfluidic transfer tube 21, thereby forming a microfluidic circuit. The negative pressure in the inner cavity of the vascular device creates a fluid jet between the outer and inner cavities of the main body part 10 through the inflow hole 11, thereby inducing fragmentation and movement of the thrombus 2. The thrombus 2 along the fluid jet becomes fragmented and miniaturized, and is stuck in the inflow holes 11 while moving, thereby being fragmented or being deformed to be smaller to pass and move through the holes.

Step 5) Recovery of Vascular Device

To finish the aspiration process through the microcircuit, the vascular device, which was positioned in the blood vessel section coaxially with the guide catheter 100, is slowly recovered from the body while simultaneously executing the aspiration of the microinjection pump 22 and the aspiration of the aspiration pump 300. To provide continuous effective aspiration force of the microflow circuit, an additional aspiration catheter is installed coaxially inside the guide catheter 100, is positioned at the thrombus section, and is connected to the aspiration pump 300, such that the aspiration catheter and the vascular device can be slowly removed from the body as one unit. Such a method has the advantage of being able to recover the vascular device while maintaining a microfluidic circuit due to the synchronized operation of the microinjection pump 22 and the aspiration pump 300 throughout the entire recovery process.

As described above, those skilled in the art will understand that the present invention can be implemented as other concrete forms without changing the inventive concept or essential features.

Therefore, these embodiments as described above are only proposed for illustrative purposes and do not limit the present invention. It will be apparent to those skilled in the art that a variety of modifications and variations may be made without departing the spirit and scope of the present invention as defined by the appended claims. Further, such modifications and variations should not be understood independently from the technical idea or perspective of the present invention.

The invention claimed is:

1. A system for removing a thrombus generated in a blood vessel from a patient body, comprising:
a main body part configured to:
move along the blood vessel to be positioned within the blood vessel where the thrombus has occurred,
perform a revascularization function within the blood vessel during installation in the blood vessel, and
suck and transfer the thrombus during aspiration;
a microflow circuit part which is attached to an outer surface of the main body part and configured to extend to an exterior of the patient body, create a microflow circuit which acts on the thrombus to move, deform, and fragment the thrombus; and
an aspiration part which is configured to be provided to the exterior of the patient body from an inside of the blood vessel;
wherein during aspiration, the aspiration part is configured to:
block blood flow in the blood vessel;
aspirate the thrombus which has been moved, deformed and fragmented by the microflow circuit part and transferred by the main body part; and
discharge the thrombus to an outside of the patient body,
wherein the main body part is formed in a shape of a hollow stent retriever having open ends, and has a plurality of inflow holes formed on the outer surface of the main body part to allow the thrombus fragmented, deformed, and fragmented by the microflow circuit part to be introduced, and
wherein the shape of the hollow stent retriever is formed to have varying diameters, getting narrower at the front and wider towards the rear in a movement direction.

2. The system according to claim 1, wherein the microflow circuit part comprises:
a microfluidic transfer tube which is attached to the outer surface of the main body part not to overlap with the inflow holes of the main body part and is provided to the exterior of the patient body along an inside of the aspiration part, and transfers a microfluid thereinto to spray the microfluid to the thrombus; and
a microinjection pump which is connected to an end of the microfluidic transfer tube located in the exterior of the patient body to inject the microfluid into the microfluidic transfer tube.

3. The system according to claim 2, wherein the microfluidic transfer tube includes at least one microfluidic tube spirally wound and attached onto an outer circumference of the main body part, and is provided to the exterior of the patient body along the inside of the aspiration part, and a plurality of discharge holes are formed in the microfluidic transfer tube attached to the outer circumference of the main body part so that a fluid transferred from the microinjection pump is configured to be injected into the thrombus within the blood vessel.

4. The system according to claim 3, wherein the microfluidic transfer tube is divided into a functional region which is attached to the outer circumference of the main body part to inject the fluid into the thrombus through discharge holes and a support region which extends to the exterior of the patient body along the inside of the aspiration part to support the main body part.

5. The system according to claim 2, wherein the aspiration part comprises:
a guide catheter of which one side is configured to be provided at one side inside the blood vessel to block the blood flow and an other side is configured to extend to the exterior of the patient body and has a penetrated inner space to guide the microfluidic transfer tube and various devices, and is configured to transfer the thrombus to the outside from the patient body;
a hub which is connected to the end of the guide catheter located in the exterior of the patient body to connect various devices; and
an aspiration pump which is connected to one side of the hub for sucking fluid, blood, and thrombus.

6. The system according to claim 5, wherein the guide catheter comprises:
a tip; and
an expansion part which is formed on one side of the tip and can expand and contract to directly block inside the blood vessel;
a body part which is formed on one side of the expansion part to induce the expansion and contraction of the expansion part; and
a control part which is formed on one side of the body part, is connected to the hub on the other side, and drives the body part left and right to expand and contract the expansion part.

7. The system according to claim 5, wherein the microinjection pump operates in synchronization with the aspiration pump to operate simultaneously during operation.

8. A system for removing a thrombus generated in a blood vessel from a patient body, comprising:
a main body part configured to:
move along the blood vessel to be positioned within the blood vessel where the thrombus has occurred,
perform a revascularization function within the blood vessel during installation in the blood vessel, and
suck and transfer the thrombus during aspiration;
a microflow circuit part which is attached to an outer surface of the main body part and configured to extend to an exterior of the patient body, create a microflow circuit which acts on the thrombus to move, deform, and fragment the thrombus; and an aspiration part which is configured to be provided to the exterior of the patient body from an inside of the blood vessel;

wherein during aspiration, the aspiration part is configured to:

block blood flow in the blood vessel;

aspirate the thrombus which has been moved, deformed and fragmented by the microflow circuit part and transferred by the main body part; and discharge the thrombus to an outside of the patient body, wherein the system further comprises:

a microwire part which is arranged to pass through an interior of the main body part and extends to the exterior of the patient body, and configured to spray a microfluid into the blood vessel to assist the revascularization of the blood flow and the creation of flow in the microflow circuit, wherein the main body part comprises:

an outer aspiration catheter which has a hollow shape and includes a hollow interior and open ends;

an inner aspiration catheter which has a hollow shape to be provided within the outer aspiration catheter and is formed to be spaced apart from an inner surface of the outer aspiration catheter to define a spacing space so that microfluid of the microflow circuit is transferred to the spacing space;

a plurality of connection parts which are formed between the inner surface of the outer aspiration catheter and an outer surface of the inner aspiration catheter and are formed along an inner circumference of the outer aspiration catheter and an outer circumference of the inner aspiration catheter;

a front cover part which is formed in a ring shape at a front of the outer and inner aspiration catheters to block the spacing space through which the microfluid is transferred; and a rear cover part which is formed in a ring shape at a rear of the outer and inner aspiration catheters communicates with the microflow circuit to transfer the microfluid from the microflow circuit to the spacing space.

9. The system according to claim 8, wherein the outer aspiration catheter and the inner aspiration catheter are formed to have varying diameters, getting narrower at the front and wider towards the rear in the movement direction.

10. The system according to claim 8, wherein a plurality of discharge holes are formed on an outer surface of the outer aspiration catheter, in which the spacing space is located, to spray the microfluid transferred to the spacing space onto the thrombus inside the blood vessel.

11. The system according to claim 8, wherein a plurality of inflow holes are formed on the outer surface of the outer aspiration catheter, in which the connection parts are located, to allow the thrombus that has been moved, deformed, and fragmented by a microfluidic to be introduced, and the inflow holes penetrate vertically through the connection parts and an inner wall of the inner aspiration catheter to an inner circumference of the inner aspiration catheter from the outer surface of the outer aspiration catheter to communicate with an inner side of the inner aspiration catheter.

12. The system according to claim 8, wherein the microflow circuit part comprises:

a microfluidic transfer tube which is connected to an end of a rear cover part of the main body part and is provided to the exterior of the patient body along an inside of the aspiration part, and which transfers the microfluid thereinto to spray a microfluid to the thrombus; and a microinjection pump which is connected to an end of the microfluidic transfer tube located in the exterior of the patient body to inject the microfluid into the microfluidic transfer tube.

13. The system according to claim 12, wherein the aspiration part comprises:

a guide catheter of which one side is configured to be located inside the blood vessel to block the blood flow in the blood vessel and the other side is configured to be located outside the blood vessel, and which has a penetrated inside to guide the microfluidic transfer tube and other endovascular devices and to transfer the thrombus to the outside from the patient body;

a hub which is connected to the end of the guide catheter located outside the patient body to connect various devices; and an aspiration pump which is connected to one side of the hub to aspirate fluid, blood, and thrombus.

14. The system according to claim 13, wherein the guide catheter comprises:

a tip; and an expansion part which is formed on one side of the tip and can expand and contract to directly block inside the blood vessel;

a body part which is formed on one side of the expansion part to induce the expansion and contraction of the expansion part; and a control part which is formed on one side of the body part, is connected to the hub on the other side, and drives the body part left and right and back and forth to expand and contract the expansion part.

15. The system according to claim 13, wherein the microinjection pump operates in synchronization with the aspiration pump to operate simultaneously during operation.

16. The system according to claim 8, wherein the microwire part comprises:

a microwire which extends from the interior of the main body part to the exterior of the patient body along an inner part of the aspiration part, and has a plurality of spray holes formed at an end of the microwire that penetrates the interior of the main body part to spray the microfluid transferred into the blood vessel; and a fluid injection pump which is connected to another end of the microwire arranged on the exterior of the patient body to inject and move the microfluid into the microwire.

17. A system for removing a thrombus generated in a blood vessel from a patient body, comprising:

a main body part configured to:

move along the blood vessel to be positioned within the blood vessel where the thrombus has occurred, perform a revascularization function within the blood vessel during installation in the blood vessel, and suck and transfer the thrombus during aspiration;

a microflow circuit part which is attached to an outer surface of the main body part and configured to extend to an exterior of the patient body, create a microflow circuit which acts on the thrombus to move, deform, and fragment the thrombus; and an aspiration part which is configured to be provided to the exterior of the patient body from an inside of the blood vessel;

wherein during aspiration, the aspiration part is configured to:

block blood flow in the blood vessel;
aspirate the thrombus which has been moved, deformed and fragmented by the microflow circuit part and transferred by the main body part; and
discharge the thrombus to an outside of the patient body,
wherein the system further comprises:
a drug delivery device which is formed in a thrombus removal device to deliver drugs transferred from the outside to a vascular wall through the microflow circuit generated in the thrombus removal device; and
a local vascular wall fluid collection device which is formed in the thrombus removal device to collect body fluid stagnant in a vascular wall space and deliver the body fluid to an extracorporeal analyzer to analyze a type and quantity of intercellular transfer substances,
wherein the main body part comprises:
the thrombus removal device which is formed in a maze partition type capable of creating an endovascular revascularization and a microflow circuit; the thrombus removal device comprising:
an outer tube which has a hollow shape and a hollow interior, and of which both end portions are opened;
an inner tube which has a cylindrical shape to be provided within the outer tube and is formed to be spaced apart from an inner surface of the outer tube to form a space; and
a maze partition which is formed vertically in the space between the outer tube and the inner tube to block the opened both end portion of the space and to guide a microfluid of the microflow circuit part transferred to the space in multiple directions.

18. The system according to claim 17, wherein the outer tube and inner tube are formed to have varying diameters, getting narrower at the front and wider towards the rear in a movement direction.

19. The system according to claim 17, wherein multiple maze partitions are formed in the space to partition the space into multiple sections having different functions in each space, and
wherein the space sections are divided into a plurality of discharge spaces which discharge the microfluid transferred from the microflow circuit part to an outside of the main body part, and a plurality of penetration spaces into which the thrombus moved, transformed, and fragmented by the microfluid is configured to be introduced, and which is configured to transfer the thrombus to an inside of the inner tube.

20. The system according to claim 19, wherein multiple discharge holes which communicate with the discharge spaces are formed on an outer surface of the outer tube, in which the discharge spaces are located, such that the microfluid transferred to the discharge spaces is sprayed onto the thrombus inside the blood vessel,
wherein multiple inflow holes are formed on the outer surface of the outer tube, in which the penetration spaces of the space are located, such that thrombus moved, deformed, and fragmented by the microfluid is introduced, and
wherein the inflow holes penetrate vertically through the outer surface of the outer tube and the inner tube located in the penetration spaces to communicate with the inside of the inner tube.

21. The system according to claim 17, wherein the microflow circuit part comprises:
a microfluidic transfer tube which is connected to a rear surface of the maze partition of the main body part, is provided to the exterior of the patient body along the inside of the aspiration part, and transfers the microfluid thereinto to spray a microfluid to the thrombus; and
a microinjection pump which is connected to an end of the microfluidic transfer tube located in the exterior of the patient body to inject the microfluid into the microfluidic transfer tube.

22. The system according to claim 21, wherein the aspiration part comprises:
a guide catheter of which one side is configured to be located inside the blood vessel to block the blood flow in the blood vessel and the other side is configured to be located outside the blood vessel, and which has a penetrated inside to guide the microfluidic transfer tube and other endovascular devices and to transfer the thrombus to the outside from the patient body;
a hub which is connected to the end of the guide catheter located outside the patient body to connect various devices; and
an aspiration pump which is connected to one side of the hub to aspirate fluid, blood, and thrombus.

23. The system according to claim 22, wherein the guide catheter comprises:
a tip; and
an expansion part which is formed on one side of the tip and can expand and contract to directly block inside the blood vessel;
a body part which is formed on one side of the expansion part to induce the expansion and contraction of the expansion part; and
a control part which is formed on one side of the body part, is connected to the hub on the other side, and drives the body part left and right and back and forth to expand and contract the expansion part.

24. The system according to claim 22, wherein the microinjection pump operates in synchronization with the aspiration pump to operate simultaneously during operation.

* * * * *